United States Patent
Knez et al.

(10) Patent No.: US 11,824,234 B1
(45) Date of Patent: Nov. 21, 2023

(54) COOLING MULTIPLE PARALLEL HYDROGEN FUEL CELL STACKS

(71) Applicant: First Mode IPP Limited, London (GB)

(72) Inventors: Adam Knez, Vashon, WA (US); Spencer M. Anunsen, Seattle, WA (US); Stuart Benson, Auburn, WA (US); Marie Pahlmeyer, Bainbridge Island, WA (US); Robert McMullen, Redmond, WA (US); Liam Burke, Normandy Park, WA (US)

(73) Assignee: First Mode IPP Limited, London (GB)

( * ) Notice: Subject to any disclaimer, the term of this patent is extended or adjusted under 35 U.S.C. 154(b) by 0 days.

(21) Appl. No.: 17/936,643

(22) Filed: Sep. 29, 2022

(51) Int. Cl.
H01M 8/04029 (2016.01)
H01M 8/04007 (2016.01)
H01M 8/0432 (2016.01)
H01M 8/04746 (2016.01)

(52) U.S. Cl.
CPC ... *H01M 8/04029* (2013.01); *H01M 8/04074* (2013.01); *H01M 8/04365* (2013.01); *H01M 8/04768* (2013.01)

(58) Field of Classification Search
None
See application file for complete search history.

(56) References Cited

U.S. PATENT DOCUMENTS

| | | | | |
|---|---|---|---|---|
| 2002/0164511 A1* | 11/2002 | Uozumi | ............ | H01M 8/04029 429/429 |
| 2004/0157094 A1* | 8/2004 | Reiser | ............... | H01M 8/04029 429/456 |
| 2009/0104478 A1* | 4/2009 | Wahlmuller | ...... | H01M 8/04231 429/411 |
| 2015/0270566 A1* | 9/2015 | Lee | .................... | H01M 8/04014 415/175 |
| 2020/0171976 A1* | 6/2020 | Lee | ......................... | B60L 58/32 |

FOREIGN PATENT DOCUMENTS

WO    WO-2022090173 A1    5/2022

* cited by examiner

*Primary Examiner* — Haroon S. Sheikh
(74) *Attorney, Agent, or Firm* — COOLEY LLP

(57) ABSTRACT

The present disclosure provides a fuel cell electrical power system, a first fuel cell module, a second fuel cell module, a heat exchanger, a common coolant, a first coolant piping branch, and a second coolant piping branch. A first pump and a first valve are disposed on the first coolant branch, and a second pump and a second valve are disposed on the second coolant branch. The fuel cell electrical power system is capable of functioning in a condition in which the second fuel cell module and the second pump are not operating to cause substantially all of the flow rate of coolant fluid produced by the first pump to circulate through the common coolant piping and to circulate substantially none of the flow rate of the coolant fluid produced by the first pump through the second fuel cell module.

18 Claims, 16 Drawing Sheets

COOLING MULTIPLE PARALLEL HYDROGEN FUEL CELL STACKS

TECHNICAL FIELD

Embodiments described herein are related to hydrogen fuel cells, and more particularly, to methods and systems for cooling multiple fuel cell stacks arranged in a parallel electrical circuit.

BACKGROUND

Hydrogen fuel cells are useful sources of electrical energy, but generate heat during operation and must be cooled to maintain the fuel cell within a desired temperature range. As shown in FIG. 1, a hydrogen fuel cell (in this illustration, a polymer electrode membrane, or PEM, type fuel cell) includes two electrodes—a negative electrode (or anode) and a positive electrode (or cathode)—sandwiched around an electrolyte. Hydrogen is fed to the anode, and air is fed to the cathode. A catalyst at the anode separates hydrogen molecules into protons and electrons, which take different paths to the cathode. The electrons go through an external circuit, creating a flow of electricity. The protons migrate through the electrolyte to the cathode, where they unite with oxygen and the electrons to produce water and heat. Multiple individual fuel cells are typically grouped together into a fuel cell stack, in a series electrical arrangement, to produce a desired voltage output (the sum of the relatively small voltage outputs of individual fuel cells). A fuel cell module includes one or more fuel cell stacks and other components to interface with hydrogen, air, and coolant sources and outflows, and electricity output at the voltage produced by the fuel cell stack(s).

A primary mechanism for removing the heat to maintain the fuel cell module in its desired operating temperature range (e.g. 40-60° C.) is to circulate cooling fluid (such as deionized water, with or without an antifreeze such as polyethylene glycol (PEG)) through the fuel cell module, and thus though the fuel cell stack. The rate at which heat can be removed from the fuel cell stack is correlated with the volumetric flow rate of the coolant fluid through the stack, which in turn is correlated with the pressure of the coolant fluid circulating through the stack (for a given coolant channel configuration). There is an upper limit on the coolant pressure in the stack, in particular the pressure difference (or "cross-pressure") between the pressure of the coolant fluid and the pressure of the reactant, i.e. the air side.

A schematic illustration of a conventional cooling arrangement for a single fuel cell module is shown in FIG. 2. Coolant (such as water) is circulated through the fuel cell module FCM and a suitable heat exchanger, such as radiator RDT, by a pump PMP. A header tank (or expansion tank) HDT provides overflow capacity, accommodates thermal expansion of the volume of the coolant, and maintains a head of pressure on the system. The pressure at the outlet side of the fuel cell module FCM and the inlet of the pump PMP is approximately the same, and is established by the atmospheric or ambient pressure to which fluid in the header tank HDT is exposed, plus the hydrostatic pressure generated by the header tank (i.e., the head resulting from the height of the header tank above the fluid circuit). This positive gauge pressure can be analogized to the ground voltage in an electrical circuit. The arrangement shown in FIG. 2 produces the lowest coolant pressure in the fuel cell module FCM, because the fuel cell module FCM outlet is at the "ground" pressure, and is on the opposite side of the radiator RDT from the outlet of the coolant pump PMP.

Known fuel cell modules include a controller (not shown in FIG. 2) that can receive inputs from sensors in the fuel cell module FCM (such as one or more temperature sensors that measure the temperature at point(s) of interest in the fuel cell module FCM, such as the temperature of the coolant at the outlet of the fuel cell module FCM) and that can provide control signals (shown in FIG. 2 by a dash/dot line) to the pump PMP. Thus, if the controller of the fuel cell module FCM detects that a temperature in the module is higher or lower than a desired temperature, the controller can command the pump PMP to increase or decrease, respectively, its operating speed and thus the flow rate of coolant that is produces.

In some applications, such as where a high power output is required, it may be desirable to connect multiple fuel cell modules in a parallel electrical arrangement, so that the output current of the fuel cell modules can be summed. It may further be desirable to continue to operate such as system even if one or more of the multiple fuel cell modules are inoperative. In such conditions, each operating fuel cell module must still be adequately cooled. There is therefore a need to control the flow of coolant through each fuel cell module in a parallel fuel cell module arrangement.

SUMMARY

Embodiments described herein are related to systems and methods for cooling multiple fuel cell modules included in a fuel cell electrical power system. Particularly, systems and methods described herein relate to fuel cell electrical power systems that include at least a first fuel cell module, a second fuel cell module, a heat exchanger, a common coolant piping, a first coolant piping branch, a second coolant piping branch, a first pump, and a second pump. The first fuel cell module and the second fuel cell module are arranged in parallel. The first and second pump are disposed between an outlet of the common coolant piping and the first and second fuel cell modules, respectively and configured to pump the coolant fluid towards the first coolant piping branch and the second coolant piping branch, respectively, such that when one of the fuel cell module is not operational, all the coolant fluid flows through the operational fuel cell module, which advantageously reduces operational losses.

In one aspect, a fuel cell electrical power system includes a first fuel cell module, a second fuel cell module, and a heat exchanger. The fuel cell electrical power system also includes a common coolant piping having an inlet end and an outlet end and being fluidically coupled to the heat exchanger to carry coolant fluid through the heat exchanger from an inlet. A first coolant piping branch is fluidically coupled in series to the outlet end of the common coolant piping, the first fuel cell module, and the inlet end of the common coolant piping. A second coolant piping branch is fluidically coupled in series to the outlet end of the common coolant piping, the second fuel cell module, and the inlet end of the common coolant piping. A first pump is disposed on the first coolant branch between the outlet of the common coolant piping and the first fuel cell module, and operable to generate a controllable flow rate of coolant fluid through the first coolant branch. A second pump is disposed on the second coolant branch between the outlet of the common coolant piping and the second fuel cell module, and operable to generate a controllable flow rate of coolant fluid through the second coolant branch. A first valve is disposed on the first coolant piping branch and configured to selectively modulate the flow of coolant fluid through the first coolant piping branch, and a second valve is disposed on the second coolant piping branch and configured to selectively modulate the flow of coolant fluid through the second coolant piping branch. The fuel cell electrical power system is capable of functioning in a condition in which the second fuel cell module and the second pump are not operating to cause substantially all of the flow rate of coolant fluid produced by the first pump to circulate through the common coolant piping and to circulate substantially none of the flow rate of the coolant fluid produced by the first pump through the second fuel cell module.

In another aspect, a method of cooling a fuel cell electrical power system is described. The fuel cell electrical power system has a first fuel cell module, a second fuel cell module, and a heat exchanger. The fuel cell electrical power system also includes a common coolant piping having an inlet end and an outlet end and being fluidically coupled to the heat exchanger to carry coolant fluid through the heat exchanger from an inlet. A first coolant piping branch is fluidically coupling in series to the outlet end of the common coolant piping, the first fuel cell module and the inlet end of the common coolant piping. A second coolant piping branch is fluidically coupling in series to the outlet end of the common coolant piping, the second fuel cell module and the inlet end of the common coolant piping. Moreover, the fuel cell electrical power system also includes a first pump disposed on the first coolant piping branch between the outlet end of the common coolant piping and the first fuel cell module and operable to generate a controllable rate of flow coolant fluid in a first direction through the first coolant piping branch, and a second pump disposed on the second coolant piping branch between the outlet end of the common coolant piping and the second fuel cell module and operable to generate a controllable rate of flow of coolant fluid through the second coolant piping branch. The method includes causing the first pump to pump coolant fluid through the first coolant piping branch and the first fuel cell module while the first fuel cell module is generating electrical power. The second pump is caused to pump coolant fluid through the second coolant piping branch and the second fuel cell module while the second fuel cell module is generating electrical power. Then, the first fuel cell module is caused to cease generating electrical power and the first pump is caused to cease pumping coolant fluid. Moreover, coolant fluid pumped by the second pump is prevented from passing through the first coolant piping branch and the first fuel cell module while the first fuel cell module is not generating electrical power, so that substantially all of the coolant fluid pumped by the first pump passes through the heat exchanger.

DETAILED DESCRIPTION

Figure 1:
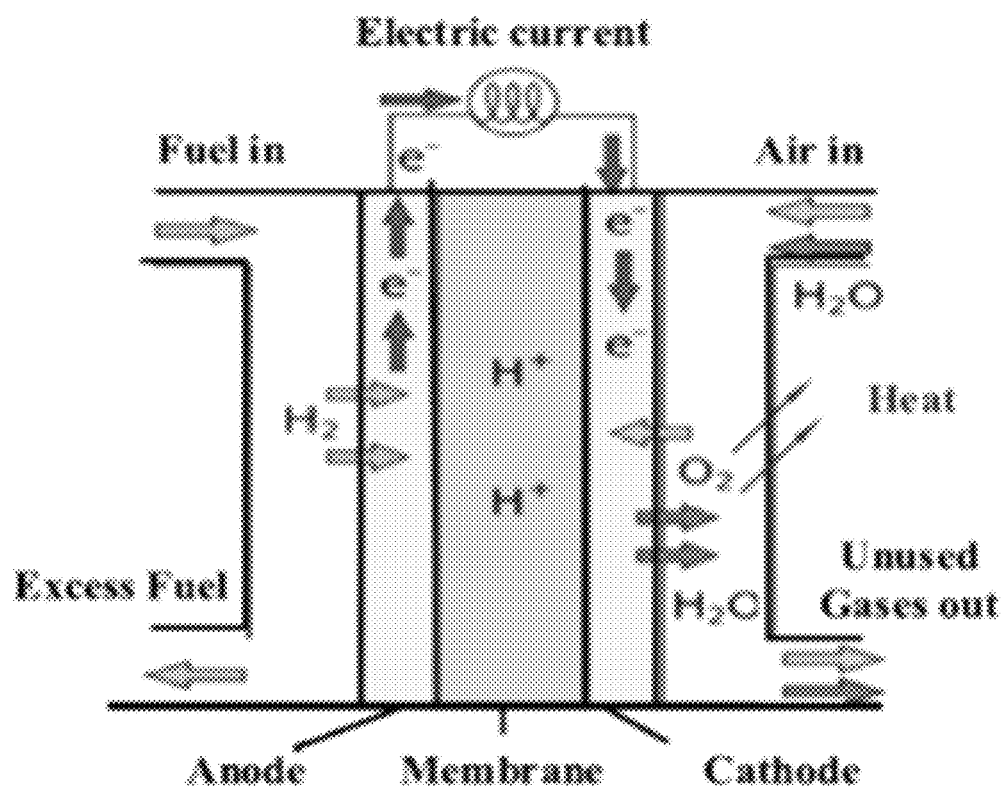
FIG. 1 is a schematic illustration of a known fuel cell configuration.
Figure 2:
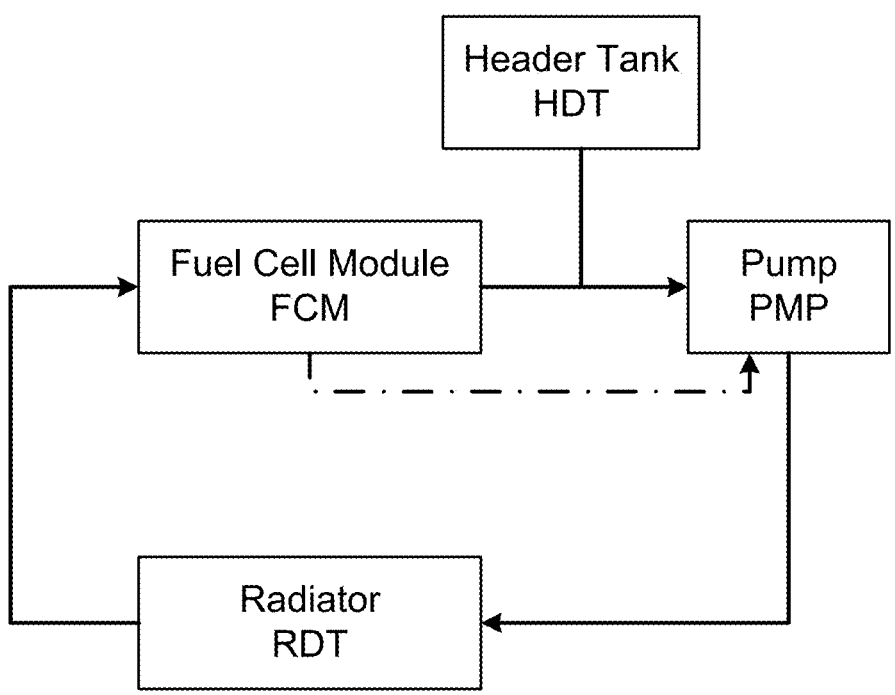
FIG. 2 is a schematic illustration of a known cooling system configuration for a fuel cell module.

The present disclosure provides systems and methods for cooling multiple fuel cell modules included in a fuel cell electrical power system. Particularly, systems and methods described herein relate to fuel cell electrical power systems that include at least a first fuel cell module, a second fuel cell module, a heat exchanger, a common coolant piping, a first coolant piping branch, a second coolant piping branch, a first pump, a second pump. The first fuel cell module and the second fuel cell module are arranged in parallel. The first and second pump are disposed between an outlet of the common coolant piping and the first and second fuel cell modules, respectively and configured to pump the coolant fluid towards the first coolant piping branch and the second coolant piping branch, respectively, such that when one of the fuel cell module is not operational, all the coolant fluid flows through the operational fuel cell module, which advantageously reduces operational losses.

The terminology used herein is for the purpose of describing particular embodiments only and is not intended to limit the full scope of any embodiment and/or the full scope of the claims. Unless defined otherwise, all technical, industrial, and/or scientific terms used herein are intended to have the same meaning as commonly understood by one of ordinary skill in the art.

As used herein, the singular forms "a," "an," and "the" are intended to include the plural forms as well, unless the context clearly indicates otherwise. With respect to the use of singular and/or plural terms herein, those having skill in the art can translate from the singular to the plurality and/or vice versa as is appropriate for the context and/or application. Furthermore, any reference herein to a singular component, feature, aspect, etc. is not intended to imply the exclusion of more than one such component, feature, aspect, etc. (and/or vice versa) unless expressly stated otherwise.

As used herein, the terms "substantially," "approximately," and "about" used throughout this Specification and the claims generally mean plus or minus 10% of the value stated, e.g., about 100 would include 90 to 110.

In general, terms used herein and in the appended claims are generally intended as "open" terms unless expressly stated otherwise. For example, the term "including" should be interpreted as "including but not limited to," the term "having" should be interpreted as "having at least," etc. Similarly, the term "comprising" may specify the presence of stated features, elements, components, integers (or fractions thereof), steps, operations, and/or the like but does not preclude the presence or addition of one or more other features, elements, components, integers (or fractions thereof), steps, operations, and/or the like unless such combinations are otherwise mutually exclusive.

As used herein the term "and/or" includes any and all combinations of one or more of the associated listed items. It should be understood that any suitable disjunctive word and/or phrase presenting two or more alternative terms, whether in the written description or claims, contemplate the possibilities of including one of the terms, either of the terms, or both terms. For example, the phrase "A and/or B" will be understood to include the possibilities of "A" alone, "B" alone, or a combination of "A and B."

All ranges described herein include each individual member or value and are intended to encompass any and all possible subranges and combinations of subranges thereof unless expressly stated otherwise. Any listed range should be recognized as sufficiently describing and enabling the same range being broken down into at least equal subparts unless expressly stated otherwise.

As noted above, in some applications, such as where a high power output is required, it may be desirable to connect multiple fuel cell modules in a parallel electrical arrangement. In a conventional, single fuel cell electrical power system, if the fuel cell fails, or needs to be shut down (e.g., because it is operating outside of required or safe operating parameters), then the entire fuel cell electrical power system is rendered inoperative. However, in a fuel cell electrical power system with multiple fuel cell modules, the system may be operated with less than all, or in the limit with only one, fuel cell module functioning, and still provide sufficient output to meet at least some needs of the application in which the fuel cell electrical power system is being used. However, to enable this desirable capability, it is necessary for the remaining, operating fuel cell module(s) to be operated within desired parameters, e.g. to be adequately cooled. It may be impractical (e.g., too expensive, require too much weight and/or volume of equipment, etc.), for each fuel cell module to have its own, dedicated cooling system. It is therefore desirable to cool all of the fuel cell modules with a single coolant flow system, and to architect the coolant flow system so that each fuel cell module is adequately cooled regardless of the operating condition of every other fuel cell module.

Figure 3:
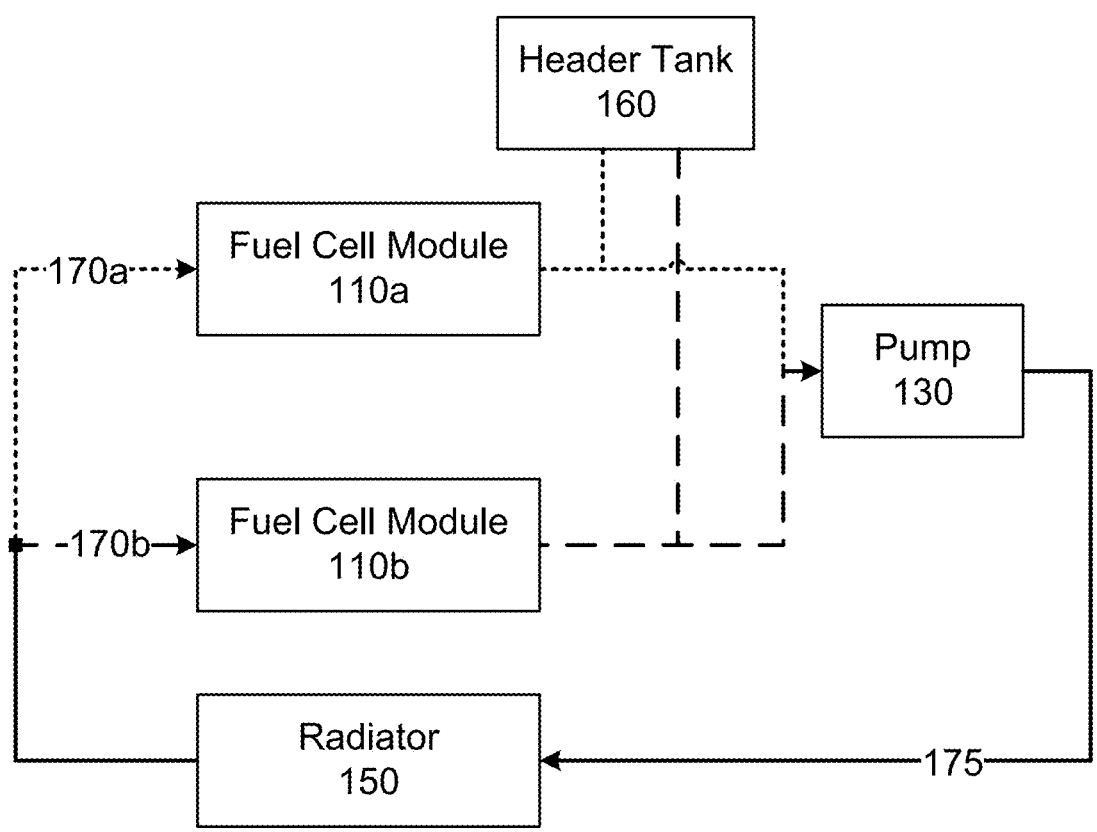
FIG. 3 is a schematic illustration of a cooling system configuration for a parallel fuel cell electrical power system with a single coolant pump.

One approach to cooling multiple parallel fuel cells is to use a single pump circulating coolant through both fuel cell modules, as shown schematically in FIG. 3. In this arrangement, fuel cell electrical power system 100 includes two fuel cell modules 110a, 110b. Although the system is shown in FIG. 3 as including two fuel cell modules, this is only for simplicity of illustration, and the system can include three, four, or more fuel cell modules. Although the system is shown in FIG. 3 as including multiple fuel cell modules arranged in parallel electrical configuration, in other embodiments the fuel cell modules could be arranged in series electrical configuration, or in combination series/parallel configuration. Although not shown in FIG. 3, each fuel cell module can include a controller, sensors for input to the controller, and control outputs to the pump, as described above. Although a polymer electrode membrane type fuel cell is described above in FIG. 1, any or all of the fuel cell modules shown in FIG. 3 can be any type of fuel cell that requires or could benefit from heat energy removal by a coolant system, including anion exchange membrane and high temperature PEM fuel cells. System 100 includes a pump 130. The pump may be any suitable type of pump, such as continuous flow pumps including centrifugal pumps, and positive displacement pumps, that can pump a suitable coolant fluid at requisite pressures, flow rates, etc. Pump 130 can circulate coolant fluid through the fuel cell modules, as shown in FIG. 3. Pump 130 can be controlled by a controller of one of the fuel cell modules 110a, 110b. In other embodiments, pump 130 can be controlled by a central controller, which controller could receive sensor inputs from all of the fuel cell modules.

Suitable coolant fluid(s) can include water and mixtures of water and materials (such as ethylene glycol) that have a lower freezing temperature than water. The coolant fluid preferably contains little or no ionic species, so that the electrical conductivity of the coolant fluid is very low and thus so that the coolant fluid presents high resistance to current leakage from the fuel cell modules.

Each fuel cell module 110a, 110b can have an associated coolant piping branch through which coolant circulates only to one fuel cell module—in the embodiment shown in FIG. 3, fuel cell module 110a is associated with coolant piping branch 170a (shown in dotted lines) and fuel cell module 110b is associated with coolant piping branch 170b (shown in dashed lines). Coolant pipe branches 170a, 170b are coupled to common coolant piping 175, which circulates coolant through a suitable heat exchanger, such as heat exchanger 150. Although the system shown in FIG. 3 includes two fuel cell modules coupled to a single heat exchanger, in other embodiments more than two fuel cell modules can be coupled to a single heat exchanger, and in yet other embodiments the system can include more than one heat exchanger, and each heat exchanger may be coupled to two or more fuel cell modules. Although the system shown in FIG. 3 includes a single heat exchanger 150 coupled to multiple coolant pipe branches 170a, 170b by common coolant piping 175, in other embodiments each fuel cell module could have dedicated coolant piping connected to a dedicated heat exchanger, or to a dedicated section of a common heat exchanger. Although referred to as a heat exchanger, element 150 can be any suitable heat exchanger, by which heat energy can be transferred from the coolant fluid to a heat sink. The heat sink can be the environment around the system, such as ambient air, water, ground, etc. The heat exchanger can be any suitable type of fluid/air, fluid/fluid, or fluid/solid mechanism, and may be convey the heat energy by convection, conduction, radiation, or combinations of these mechanisms, and may employ mechanisms such as a refrigeration cycle, heat pipe, Peltier devices, etc. The coolant piping and the heat exchanger are preferably formed of materials that are compatible with the coolant fluid and that have a low rate of ion shedding to the coolant fluid (thus preferably not metals such as copper, steel, brass, zinc, or cast aluminum). The coolant piping is also preferably formed of a relatively low conductivity material, such as polymer-based material, to provide relatively high resistance to leakage current from the fuel cell modules. The coolant piping and heat exchanger should also be configured to withstand the design operating pressures (positive or negative gauge pressure).

Fuel cell electrical power system 100 also includes header tank 160, which is fluidically coupled to each of coolant piping branches 170a, 170b. As described above, header tank 160 provides overflow capacity, accommodates thermal expansion of the volume of the coolant, and maintains a head of pressure on the coolant in system 100. Header tank 160 can also provide a path for venting the coolant fluid hydrogen that passively leaks from the fuel cell modules into the coolant fluid. The hydrogen can passively vent directly into the ambient atmosphere if the coolant fluid in the header tank 160 is directly exposed to the atmosphere at ambient pressure, or, in embodiments in which the coolant systems is pressurized and the header tank is maintained at a positive gauge pressure, by an active venting mechanism, such as a valve. The pressure at the outlet sides of the fuel cell modules 110a, 110b and the inlet of pump 130 is approximately the same, and is established by the atmospheric or ambient pressure to which coolant in the header tank 160 is exposed, plus the hydrostatic pressure generated by the header tank 160 (i.e., the head resulting from the height of the header tank 160 above the coolant piping branches 170a, 170b). As noted above, this positive gauge pressure can be analogized to the ground voltage in an electrical circuit.

In this arrangement, differences in the flow resistance of the portions of the coolant flow loop that are specific to each fuel cell module (indicated by the dashed line in FIG. 3 for fuel cell module 110b and the dotted line for fuel cell module 110a) can cause differences in the volumetric rate of flow of the coolant fluid through each fuel cell module, i.e. the proportion of the output of pump 130 that passes through each fuel cell module. The flow rate differences can produce differences in the rate of heat transfer from each fuel cell module to the coolant fluid, and thus to undesirable differences in operating temperature of each fuel cell module.

Figure 4:
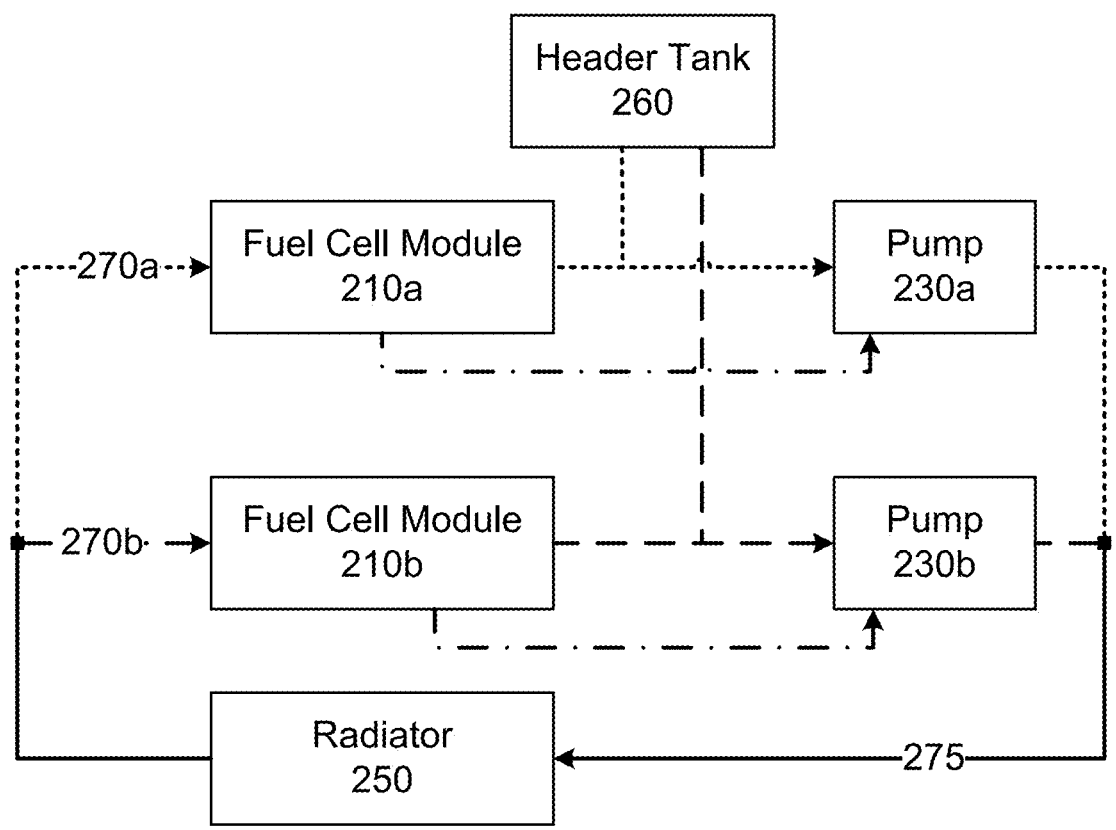
FIG. 4 is a schematic illustration of a cooling system configuration for a parallel fuel cell electrical power system with a coolant pump associated with each fuel cell module, according to an embodiment.

The degree of control over the amount of coolant flowing through each fuel cell module in a parallel fuel cell module power system can be increased over that achievable with the arrangement described with reference to FIG. 3 by providing each fuel cell module with a dedicated pump. In this arrangement, as shown schematically in FIG. 4, fuel cell electrical power system 200 includes two fuel cell modules 210a, 210b. Although not shown in FIG. 4, each fuel cell module 210a, 210b can include a controller, sensors for input to the controller, and control outputs to the associated pump, as described above. Associated with each fuel cell module 210a, 210b is a respective pump 230a, 230b (and if the system includes more than two fuel cell modules, it would include a corresponding number of pumps). Each pump 230a, 230b can circulate coolant fluid through the respective fuel cell module, to enable independent coolant fluid flow control, and thus temperature control, for each module, as shown in FIG. 4. Each pump 230a, 230b can be controlled by a controller of a respective fuel cell module, as described above, and indicated by dash-dot lines in FIG. 4. As noted above, in other embodiments, each pump 230a, 230b can be controlled by a central controller, which controller could receive sensor inputs from all of the fuel cell modules.

Each fuel cell module 210a, 210b and pump 230a, 230b can have an associated coolant piping branch through which coolant circulates only to one fuel cell module (i.e., one of the fuel cell module 210a and 210b) and one pump—in the embodiment shown in FIG. 4, fuel cell module 210a and pump 230a are associated with coolant piping branch 270a (shown in dotted lines) and fuel cell module 210b and pump 230b are associated with coolant piping branch 270b (shown in dashed lines). Coolant pipe branches 270a, 270b are coupled to common coolant piping 275, which circulates coolant through heat exchanger 250. Fuel cell electrical power system 200 also includes header tank 260, which is fluidically coupled to each of coolant piping branches 270a, 270b. The pressure at the outlet sides of the fuel cell modules 210a, 210b and the inlets of the respective pumps 230a, 230b is approximately the same, and is established by the atmospheric or ambient pressure to which coolant in the header tank 260 is exposed, plus the hydrostatic pressure generated by the header tank 260 (i.e., the head resulting from the height of the header tank 260 above the coolant piping branches 270a, 270b).

The arrangement of the fuel cell electrical power system 200 may not provide sufficient control over coolant flow through each fuel cell modules 210a, 210b, particularly in circumstances in which the operating power, and thus waste heat generation, of the fuel cell modules vary significantly. In the limit, one of the fuel cell modules 210a, 210b may be inoperative, or taken off line, and generates no waste heat. Even if the associated pump is not operated, the other pump can still drive coolant fluid through both fuel cell modules, and thus provide insufficient coolant fluid flow through the operating fuel cell module.

Figure 5A:
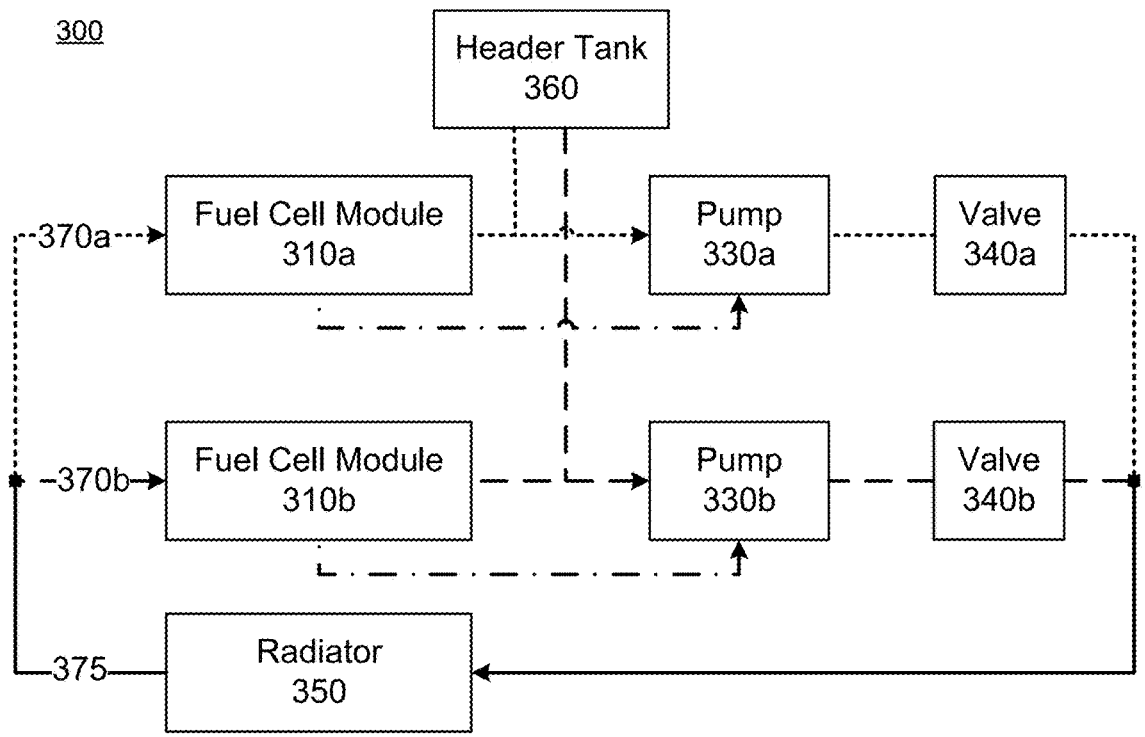
FIGS. 5A and 5B are schematic illustrations of a parallel fuel cell electrical power system with a coolant pump and a valve associated with each fuel cell module, with the header tank connected between each fuel cell module and its associated pump, according to an embodiment.
Figure 5B:
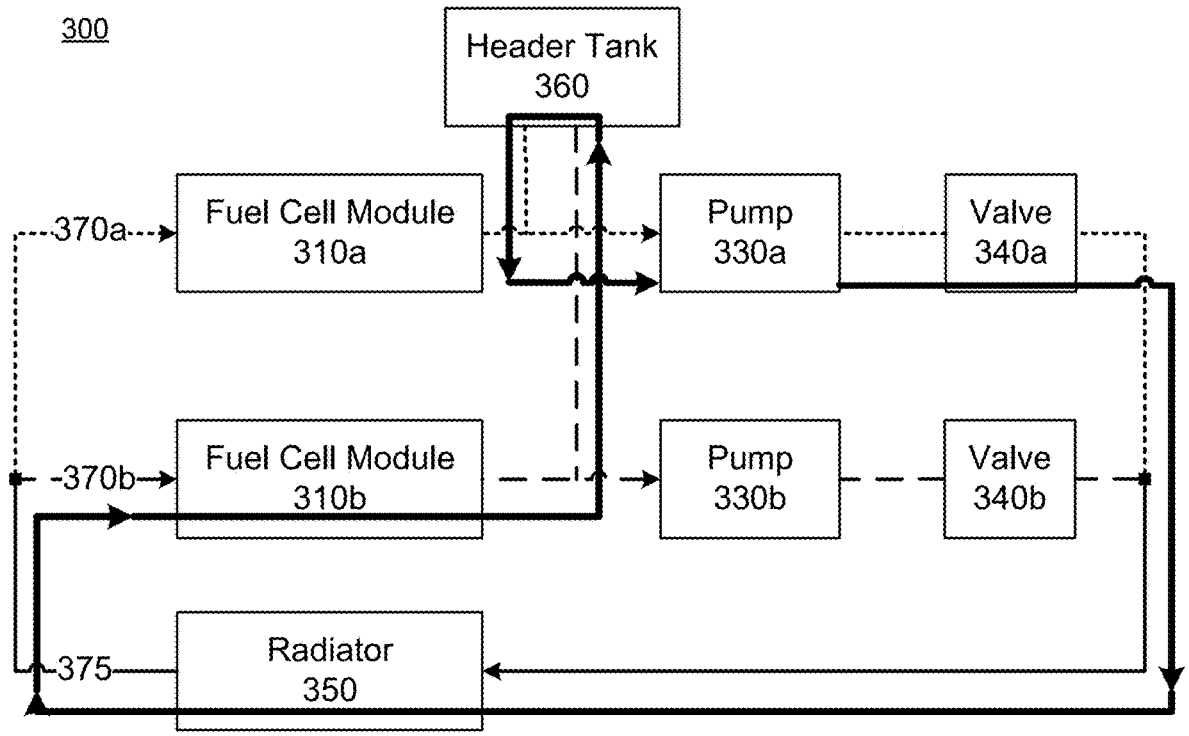

An additional degree of control over fluid flow rates through each coolant piping branch can be achieved by disposing a valve on each branch, as shown in fuel cell electrical power system 300 in FIGS. 5A and 5B. Valve 340a is disposed on, and can control or modulate the flow of coolant through, coolant piping branch 370a, and valve 340b is disposed on, and can control the flow of coolant through, coolant piping branch 370b. Each valve 340a, 340b may be a check valve, i.e., a valve that passively permits flow in one direction, and prevents flow in the opposite direction, through the valve, in response to a pressure differential (positive or negative) across the valve. Suitable check valves could include flap valves and ball valves. In other embodiments, any or all of valves 340a, 340b could be an active, controllable valve rather than a passive valve, such as a valve driven by a solenoid, motor, etc. In an example scenario in which fuel cell module 310b is not operating, and correspondingly pump 330*b* is not operating (under the control of the controller, not shown, in fuel cell module 310*b*), coolant fluid could preferentially flow from the outlet side of pump 330*a* (high pressure) through pump 330*b* and thus through fuel cell module 310*b* (and undesirably bypassing heat exchanger 350) because the flow resistance (and pressure drop) of heat exchanger 350 may be substantially higher than that of pump 330*b* and fuel cell module 310*b*.

By disposing valve 340*b* on coolant piping branch 370*b*, this undesirable flow path is blocked, and all of the output of pump 330 can be driven through heat exchanger 350. However, even with valve 340*b* closed (e.g., if valve 340*b* is a check valve that automatically closes in response to the outlet pressure of pump 330*a* being higher than the pressure on coolant piping branch 370*b*), the header tank 360 can provide an undesirable alternative flow path for some coolant pumped by pump 330*a* to bypass fuel cell module 310*a*. This path is shown in FIG. 5B by solid heavy lines and arrows. Coolant can flow along this path because the pressure on the outlet side of both fuel cell modules 310*a*, 310*b* is equal to the pressure established by header tank 360, which is lower than the pressure on the outlet side of heat exchanger 350 (and thus at the node connecting common coolant piping 375 with coolant pipe branches 370*a*, 370*b*)— the fuel cell modules 310*a*, 310*b* thus provide parallel flow paths to header tank 360, and some coolant output by pump 330*a* (and passing through heat exchanger 350) will flow through fuel cell module 310*b* (as in a parallel electrical circuit). Correspondingly, less than the desired amount of coolant fluid passes through operating fuel cell module 310*a*, compromising its temperature control.

Figure 6:
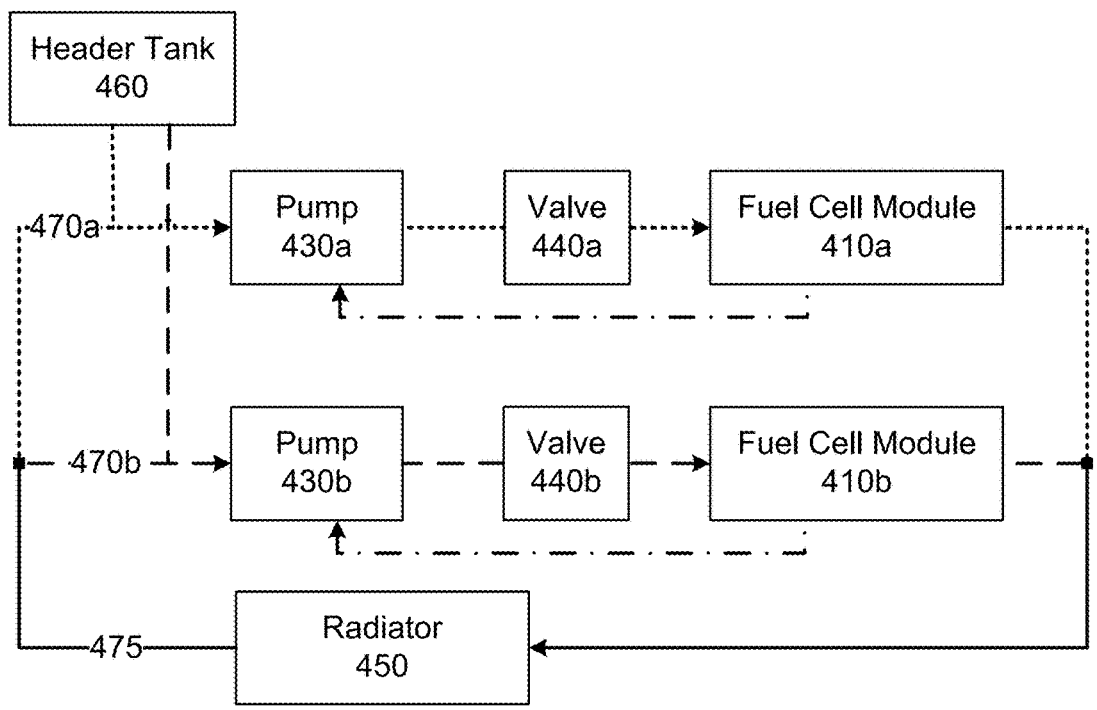
FIG. 6 is a schematic illustration of a parallel fuel cell electrical power system with a coolant pump and a valve associated with each fuel cell module, and disposed on the inlet side of the fuel cell module, according to an embodiment.

The potential shortcoming identified above for system 300 can be addressed by a fuel cell electrical power system configuration in which the pumps are disposed between the header tank and the fuel cell modules, so that the output pressure of the pumps is delivered to the inlet of the fuel cell modules. A system with such a configuration is shown in FIG. 6. In system 400, pumps 430*a* and 430*b* (and associated valves 440*a* and 440*b*) are disposed between header tank 460 and fuel cell modules 410*a*, 410*b*. As with the other configurations disclosed above, the inlet side of each pump 430*a*, 430*b* is at the fluid pressure established by header tank 460. However, in this configuration, the outlet side of each pump 430*a*, 430*b* is coupled to the coolant inlet of the respective fuel cell module 410*a*, 410*b*. Thus, the pressure of the coolant delivered to the inlet of each fuel cell module 410*a*, 410*b* is approximately equal to the pressure established by header tank 460 plus the pressure increase generated by the respective pump 430*a*, 430*b*. In a scenario in which fuel cell module 410*b* is inoperative, and correspondingly pump 430*b* is not operating and therefore not generating a pressure increase from the common pressure set by header tank 460, the higher pressure on the output side of fuel cell module 410*a* cannot drive coolant flow through fuel cell module 410*b* because valve 440*b* is closed (e.g., if valve 440*b* is a check valve, automatically in response to the higher pressure on the fuel cell module 410*b* side of valve 440*b* compared to the lower pressure on the pump 430*b* side of valve 440*b*)— all of the coolant flow on coolant pipe branch 470*a* will therefore flow through common coolant piping 475 (and heat exchanger 450).

One consequence of this arrangement is that the pressure of the coolant in the fuel modules 410*a*, 410*b* is higher than in the configurations in systems 200 and 300. This means that the cross pressure on the fuel cells (the difference between the pressure of the coolant and the air side of the cells) is higher. Pumps 430*a* and 430*b* should be selected, and their operating parameters established, so that the cross pressure does not exceed the capabilities of the fuel cell modules 410*a*, 410*b*.

Figure 7:
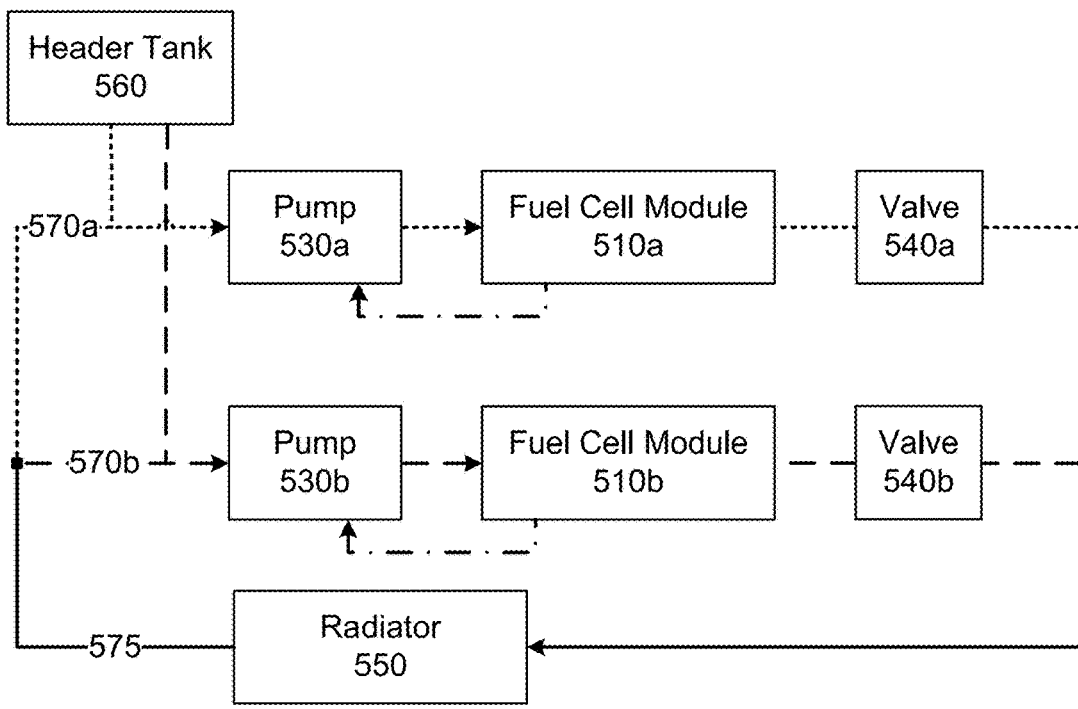
FIG. 7 is a schematic illustration of a parallel fuel cell electrical power system with a coolant pump and a valve associated with each fuel cell module, and with the pump disposed on the inlet side of the fuel cell module and the valve disposed on an outlet side of the fuel module, according to an embodiment.

Although in this embodiment valves 440*a*, 440*b* are disposed between pumps 430*a*, 430*b* and fuel cell modules 410*a*, 410*b*, the valves could be disposed in other positions on respective coolant piping branches 470*a*, 470*b*. For example, in fuel cell electrical power system 500 shown in FIG. 7, valves 540*a*, 540*b* are disposed on the outlet side of respective fuel cell modules 510*a*, 510*b* (other aspects of system 500 being the same as system 400).

Figure 8:
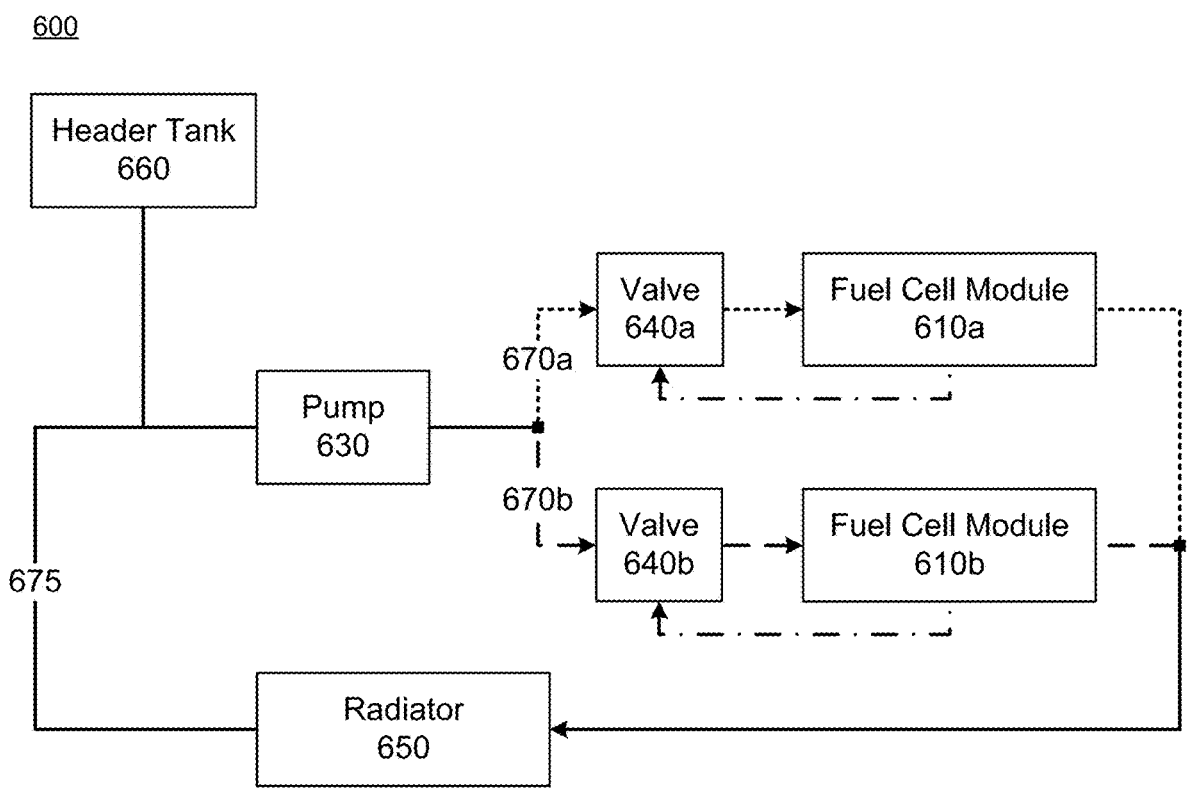
FIG. 8 is a schematic illustration of a parallel fuel cell electrical power system with a single coolant pump and with a valve associated with each fuel cell module, according to an embodiment.

Although, as discussed above, there are advantages to fuel cell electrical power system configurations in which each fuel cell module has a dedicated pump, the operation of which is controlled by the fuel cell module's controller, in some embodiments it may be desirable to have a single pump supply coolant fluid to more than one fuel cell module, and to control the amount of coolant flow through each fuel cell module by means of, for example, a flow control valve associated with each fuel cell module. Such a configuration is shown in FIG. 8. Fuel cell electrical power system 600 is configured similarly to fuel cell electrical power systems 200, 300, 400, and 500, except that a single pump 630 and the header tank 660 are disposed on the common coolant piping 675, and the coolant pipe branches 670*a*, 670*b* diverge from the outlet end of common coolant piping 675 on the outlet side of pump 630. The control of the flow of coolant through each fuel cell module 610*a*, 610*b* can be performed by controllable (rather than passive, e.g. check) valves 640*a*, 640*b*. The operation of each valve 640*a*, 640*b* (e.g. the degree to which the valve is opened, between fully opened and fully closed, and thus the amount of coolant flow between a maximum value and zero for a given coolant pressure) can be controlled by the controller of the respective fuel cell module 610*a*, 610*b* to maintain its desired operating temperature. Alternatively, as discussed above, a common central controller can be used to control the operation of the valves 640*a*, 640*b* based on inputs from sensors (e.g. temperature sensors, pressure sensors, flow sensors, or a combination thereof) on fuel cell modules 610*a*, 610*b*.

Figure 9:
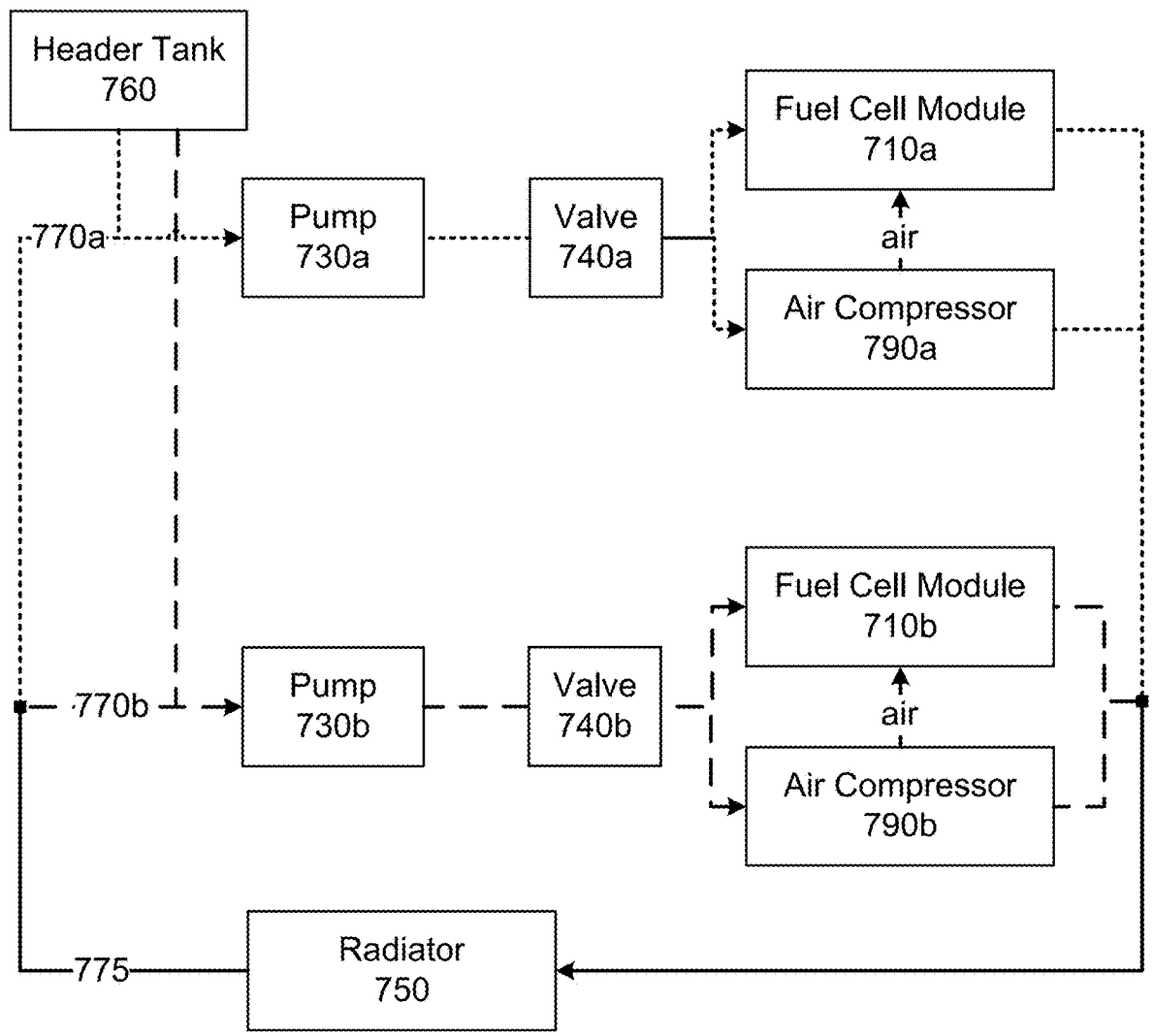
FIG. 9 is a schematic illustration of a parallel fuel cell electrical power system with a coolant pump and a valve associated with each fuel cell module and with an associated air compressor, according to an embodiment.

As described above, fuel cells require a source of pressurized air for operation. Known fuel cell electrical power systems use air compressors as sources of pressurized air for the fuel cell modules. It may be desirable to cool the pressurized air that is output by the compressor (the process of compression increasing the temperature of the air from the temperature of the input air, e.g. ambient air). In some embodiments, it may be desirable to cool the compressed air with the same coolant as is used to cool the fuel cell modules. Such a fuel cell electrical power system configuration is shown schematically in FIG. 9. Fuel cell electrical power system 700 is similar to fuel cell electrical power system 400 described above with reference to FIG. 6, except that it also includes air compressors 790*a*, 790*b*, each associated with, and supplying pressurized air to, respective fuel cell module 710*a*, 710*b*. Compressed air from air compressors 790*a*, 790*b* is cooled by coolant supplied by respective coolant piping branch 770*a*, 770*b*, respectively. In the embodiment shown in FIG. 9, each air compressor and respective fuel cell module are arranged in parallel for the coolant fluid flow, but in other embodiments they may be arranged serially, with the air compressor either upstream or downstream of the fuel cell module. In other embodiments, additional components of the fuel cell electrical power system that require or would benefit from cooling (such as a hydrogen recirculation blower) could be cooled by the same coolant used to cool the fuel cell modules, with suitable piping and heat exchangers.

Figure 10:
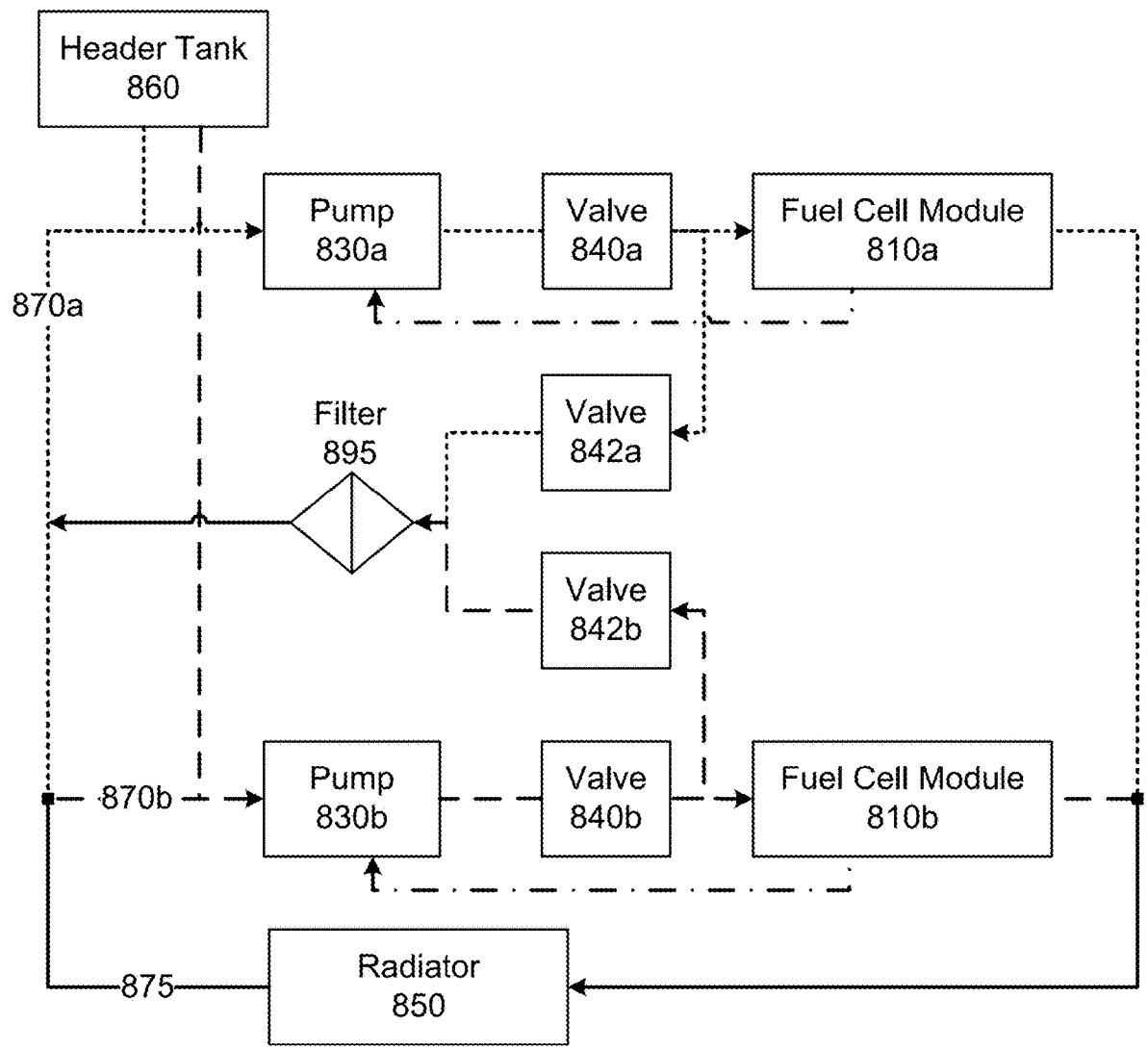
FIG. 10 is a schematic illustration of a parallel fuel cell electrical power system with a coolant pump and a valve associated with each fuel cell module, with a chemical filter for the coolant fluid, according to another embodiment.

As noted above, the coolant fluid used in the systems described herein may include water, particularly purified or deionized water. Impurities, including ionized species, may be introduced into the coolant fluid before operation, or produced in during operation, of the fuel cell electrical power system. It may therefore be desirable to include in the fuel cell electrical power system one or more chemical filters (such as deionizing filters), and to ensure that coolant fluid circulating through the fuel cell electrical power system passes through the filter(s), so long as any fuel cell module is operating (e.g., even if one or more of the fuel cell modules are not operating). Such a fuel cell electrical power system configuration is shown schematically in FIG. 10. Fuel cell electrical power system 800 is similar to fuel cell electrical power system 400 described above with reference to FIG. 6, except that it also includes a chemical filter 895. Thus, fuel cell module 810a has an associated pump 830a and valve 840a on coolant piping branch 870a, and fuel cell module 810b has an associated pump 830b and valve 840b on coolant piping branch 870b. Coolant piping branches 870a, 870b are coupled to header tank 860 and to common coolant piping 875, by which coolant fluid is conveyed through heat exchanger 850. Chemical filter 895 is coupled by a valve 842a (e.g., a check valve) to coolant piping branch 870a downstream of pump 830a, so that some of the output of pump 830a may pass through valve 842a and chemical filter 895. Similarly, chemical filter 895 is coupled by a valve 842b (e.g., a check valve) to coolant piping branch 870b downstream of pump 830b, so that some of the output of pump 830b may pass through valve 842b and chemical filter 895. The output of chemical filter 895 may be connected to coolant piping branch 870a upstream of pump 830a (although in other embodiments the output of chemical filter 895 could be connected to coolant piping branch 870b upstream of pump 830b, or to common coolant piping 875, downstream of heat exchanger 850). Thus, a portion of the coolant passing through each pump is passed through chemical filter 895 during operation of fuel cell electrical power system 800. Chemical filter 895 may be sized, and flow rates therethrough managed, so that the rate at which undesirable ions are removed from the coolant fluids matches or exceeds the rate at which such ions are introduced into the coolant fluid, such as from the fuel cell modules.

Valves 842a, 842b are disposed to prevent undesirable flow of coolant through a non-operating fuel cell, and ensure adequate coolant flow through operating fuel cell(s). For example, if fuel cell module 810b is taken off line, and correspondingly pump 830b is stopped, then the output of pump 830a can flow through valve 842a and filter 895, but cannot flow through valve 842b (a check valve) and thence fuel cell module 810b. Thus, the system maintains the desired coolant flow rate through chemical filter 895, through operating fuel cell module 810a, and through heat exchanger 850.

In some embodiments, cutoff valves (not shown) could be disposed on each side of chemical filter 895 to enable ready removal of chemical filter 895 for replacement, refurbishment, etc.

Figure 11:
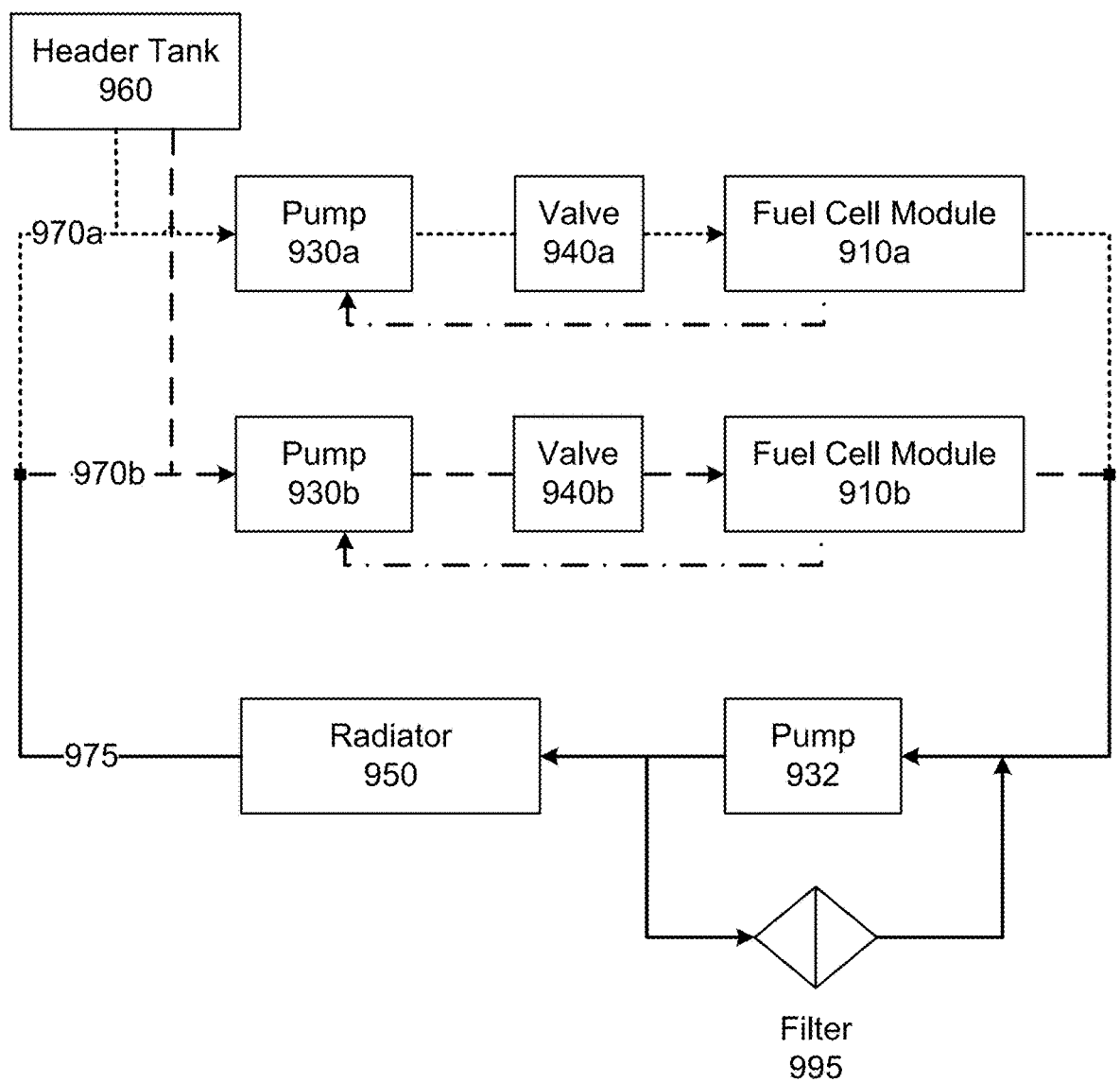
FIG. 11 is a schematic illustration of a parallel fuel cell electrical power system with a coolant pump and a valve associated with each fuel cell module, with a chemical filter for the coolant fluid and a booster pump, according to another embodiment.

Another arrangement for pumping and filtering is shown in FIG. 11. In this embodiment, fuel cell electrical power system 900 is similar to fuel cell electrical power system 400 described above with reference to FIG. 6, with fuel cell module 910a having an associated pump 930a and valve 940a on coolant piping branch 970a, and fuel cell module 910b having an associated pump 930b and valve 940b on coolant piping branch 970b, and with header tank 960, except that it also includes a chemical filter 995, which is disposed in parallel fluid arrangement with common coolant piping 975. Thus, a portion of the coolant fluid discharged from pumps 930a and/or 930b (depending on the operating state of fuel cell electrical power system 900), and passing through heat exchanger 950, passes through chemical filter 995. Also shown in this embodiment is another pump, 932, disposed on common coolant piping 975. Pump 932 may function as a supplemental, or booster, pump for the coolant, to assist the other pumps 930a, 930b in overcoming the high pressure drop and flow resistance of radiator 950 while maintaining desired flow rates. The relative position of chemical filter 995 and pump 932 need not be that shown in FIG. 11, but instead pump 932 may be upstream or downstream of chemical filter 995. In the embodiment shown in FIG. 11, the chemical filter 995 is disposed on the discharge side of the pump 932 and the chemical filter 995 is disposed parallel to the pump 932 in a bypass line disposed parallel to the common coolant piping 975 such that a portion of the coolant discharged by the pump 932 flows into the bypass line and through the chemical filter 995 back into the common coolant piping 975 upstream of the pump 932. While not shown, a valve (e.g., a check valve, a one-way valve, etc.) may be disposed in the bypass line downstream of the chemical filter 995, for example, to inhibit the coolant from flowing into the chemical filter 995 from the common coolant piping 975 from a location that is upstream of the pump 932. Further, system 900 may include only pump 932 or only chemical filter 995—it is not necessary to have both. In some embodiments, the chemical filter and/or booster pump arrangement shown in FIG. 11 may be added to the fuel cell electrical power system 800 shown in FIG. 10.

In some situations, it may be desirable to pre-filter or pre-polish the coolant fluid in the fuel cell electrical power system, to reduce conductive ion concentrations to below a desired operating threshold, before initiating full operation of the fuel cell electrical power system. Such an operation can be conducted by bringing a fuel cell electrical power system such as fuel cell electrical power system 800 shown in FIG. 10 to an initial state in which pumps 830a, 830b are operated at a desired flow rate, and fuel cell modules 810a, 810b are configured to allow coolant to flow through them but not to generate electrical power. Fuel cell electrical power system 800 can be operated in this state until a sufficient volume of the coolant has passed through chemical filter 895 to achieve the desired ion concentration. Fuel cell electrical power system 800 can then be transitioned to a normal operating state, with fuel cell modules 810a, 810b producing electrical power in a normal operating range. Fuel cell electrical power system 900 can be operated in a similar fashion, but instead of operating pumps 930a, 930b to circulate coolant through common coolant piping 975 and chemical filter 995, coolant can be circulated only with booster pump 932.

Figure 12:
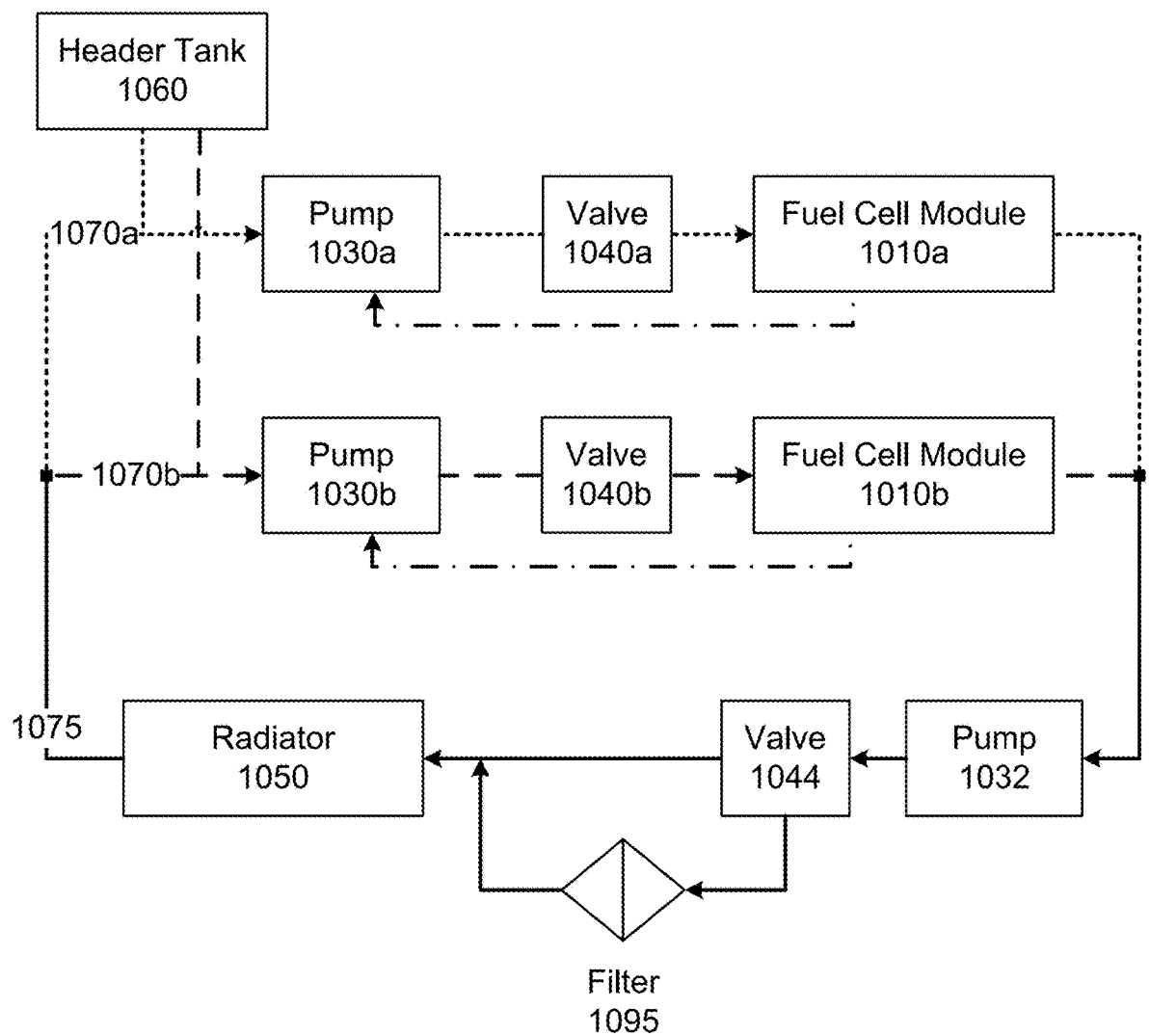
FIG. 12 is a schematic illustration of a parallel fuel cell electrical power system with a coolant pump and a valve associated with each fuel cell module, with a chemical filter for the coolant fluid selectively coupled in line with the heat exchanger and a booster pump, according to another embodiment.

In another embodiment, a chemical filter can be selectively placed in-line in the common coolant piping. Fuel cell electrical power system 1000, shown in FIG. 12, is similar to fuel cell electrical power system 900, except for the arrangement of filter 1095. In this embodiment, a valve 1044 is disposed on common coolant piping 1075, and can be configured or operable to selectively direct flow solely to pass through chemical filter 1095, solely to bypass chemical filter 1095, or direct a first portion of the coolant flow through towards the chemical filter 1095 and a second portion of the coolant flow towards the radiator 1050 (e.g., about 50% of the coolant flow towards chemical filter 1095 and 50% of the coolant flow towards the radiator 1050). With this configuration, pre-operation filtering can be performed by operating booster pump 1032 and setting valve 1044 so that the output of pump 1032 is directed solely through filter 1095, until the desired level of ions in the coolant has been achieved. Valve 1044 can then be set to bypass filter 1095 or direct only a portion of the flow towards the bypass filter 1095, and fuel cell electrical power system 1000 can commence normal, power-producing operation.

As discussed above, although shown with two fuel cell modules, any of the fuel cell electrical power systems described above can include more than two fuel cell modules, and the fuel cell modules may be electrically connected in parallel or series/parallel electrical circuits to provide the desired voltage, amperage, and power output for the electrical load to be supplied by the fuel cell electrical power system. For additional emphasis and clarity on these points, some additional embodiments are described below and illustrated in the figures.

Figure 13:
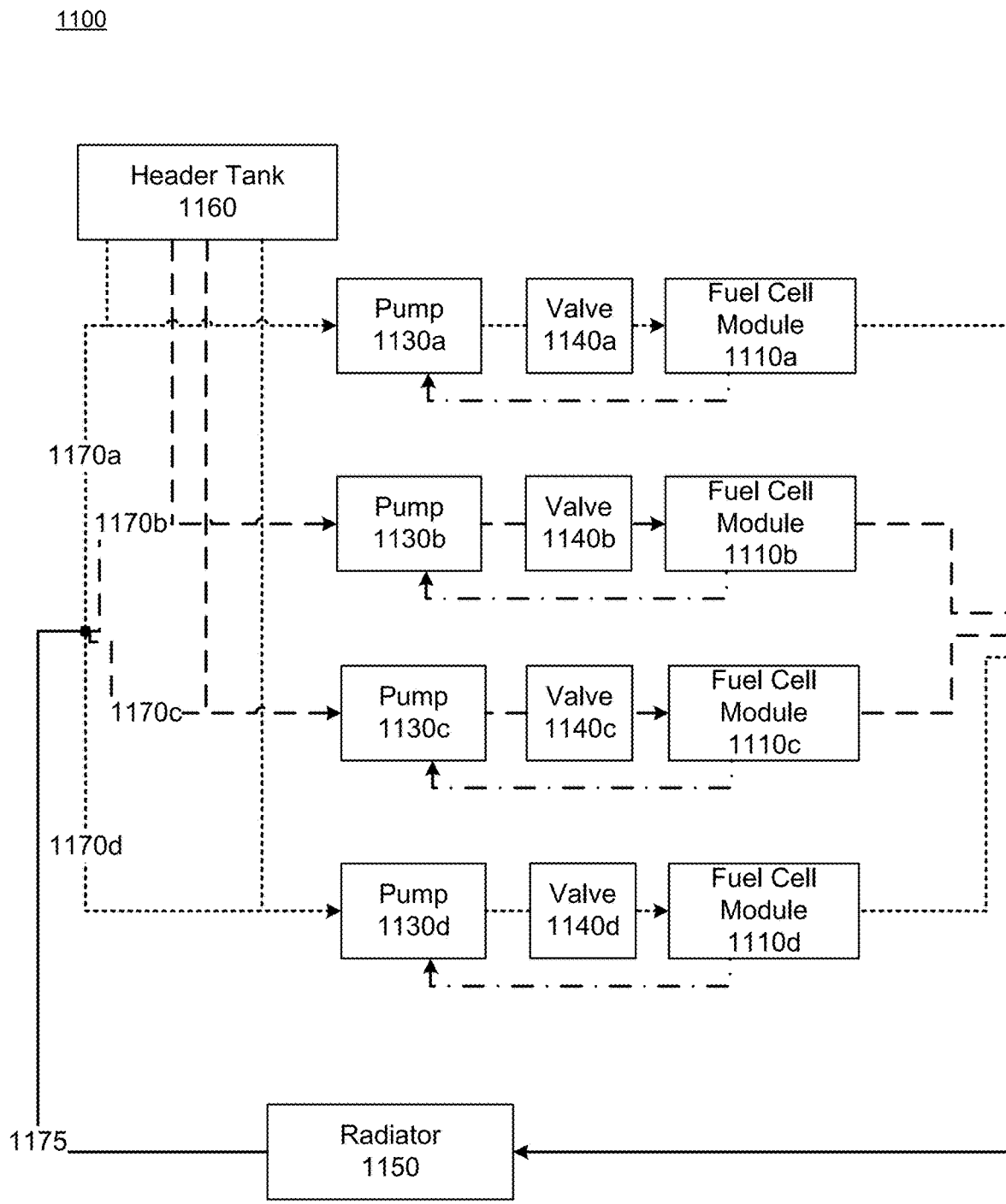
FIG. 13 is a schematic illustration of a parallel fuel cell electrical power system with four fuel cell modules (and a coolant pump and a valve associated with each fuel cell module) sharing a single common coolant piping and heat exchanger, according to another embodiment.

Fuel cell electrical power system 1100, shown in FIG. 13, is similar to fuel cell electrical power system 400 shown in FIG. 6, except that it includes four fuel cell modules, 1110a, 1110b, 1110c, and 1110d. Pumps 1130a, 1130b, 1130c, and 1130d (and associated valves 1140a, 1140b, 1140c, and 1140d) are disposed between header tank 1160 and the fuel cell modules 1110a, 1110b, 1110c, and 1110d, on coolant piping branches 1170a, 1170b, 1170c, and 1170d, respectively. The coolant piping branches are all connected to common coolant piping 1175, which carries coolant fluid through radiator 1150. As with the other configurations disclosed above, in a scenario in which any one, two, or three of the fuel cell modules not operating, and correspondingly their associated pump(s) are not operating and therefore not generating a pressure increase from the common pressure set by header tank 1160, the higher pressure on the output side of the one or more operating fuel cell module(s) cannot drive coolant flow through any of the non-operating fuel cell modules because the associated valve is closed (e.g., if the valve is a check valve, automatically in response to the higher pressure on the fuel cell module side of the valve compared to the lower pressure on the pump side of the valve)—all of the coolant fluid flow on the coolant piping branch(es) associated with the operating fuel cell module(s) will therefore flow through common coolant piping 1175 (and heat exchanger 1150).

Figure 14A:
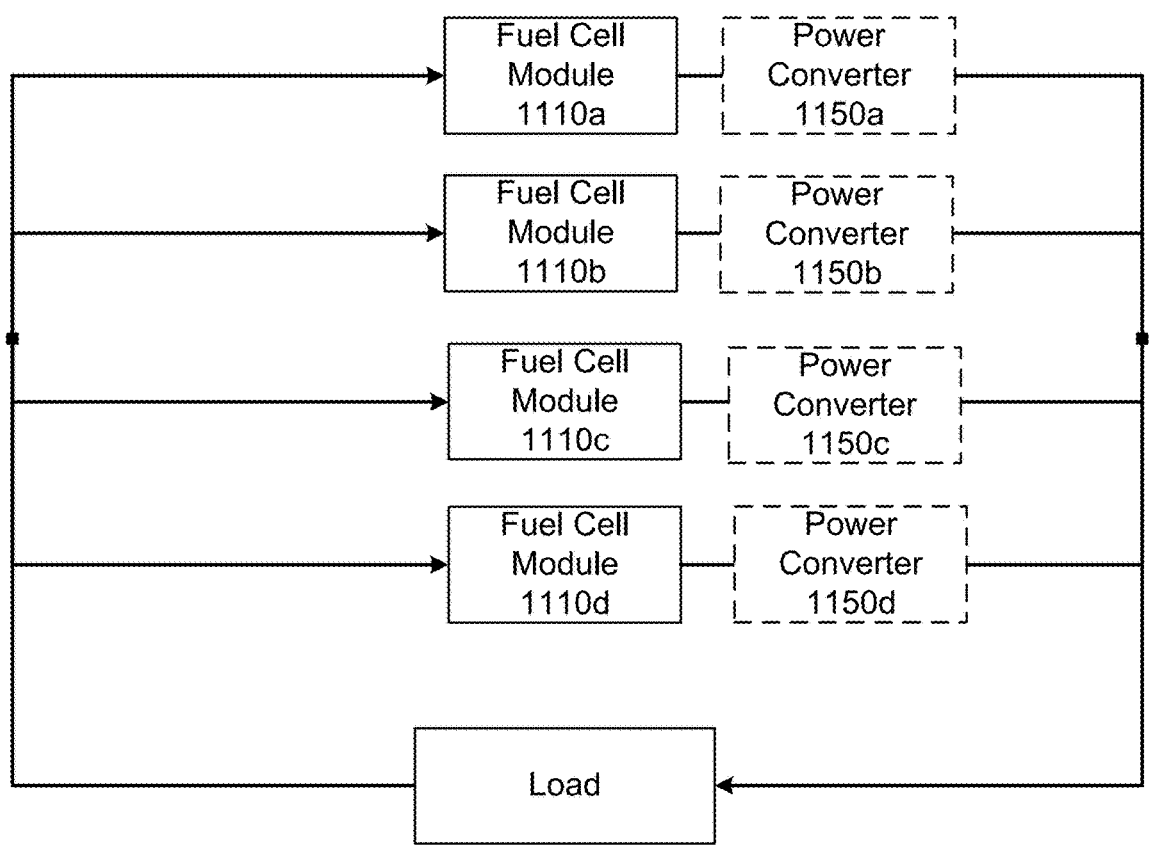
FIGS. 14A and 14B are schematic electrical illustrations of the parallel fuel cell electrical power system of FIG. 13, connected in parallel and series/parallel electrical circuits, respectively, according to another embodiment.

As shown schematically in FIG. 14A, the fuel cell modules 1110a, 1110b, 1110c, and 1100d of fuel cell electrical power system 1100 may be electrically coupled in a parallel electrical circuit, so that the output amperage (and power) of the fuel cell modules is summed, but at the same (common) voltage of each fuel cell module, to supply electrical power to the load. In some embodiments, a power converter 1150a, 1150b, 1150c, and 1150d may be disposed on the output side of the respective ones of the fuel cell modules 1110a, 1110b, 1110c, and 1110d. The power converters 1150a, 1150b, 1150c, and 1150d may include a DC to DC power converter (e.g., a boost converter) configured to step up the voltage generated by the respective ones of the fuel cell modules 1110a, 1110b, 1110c, and 1110d (and may also step down current). The power converters 1150a, 1150b, 1150c, and 1150d may allow the most power to be drawn from each of the respective fuel cell modules 1110a, 1110b, 1110c, and 1110d according to their respective capabilities to produce electrical power.

Figure 14B:
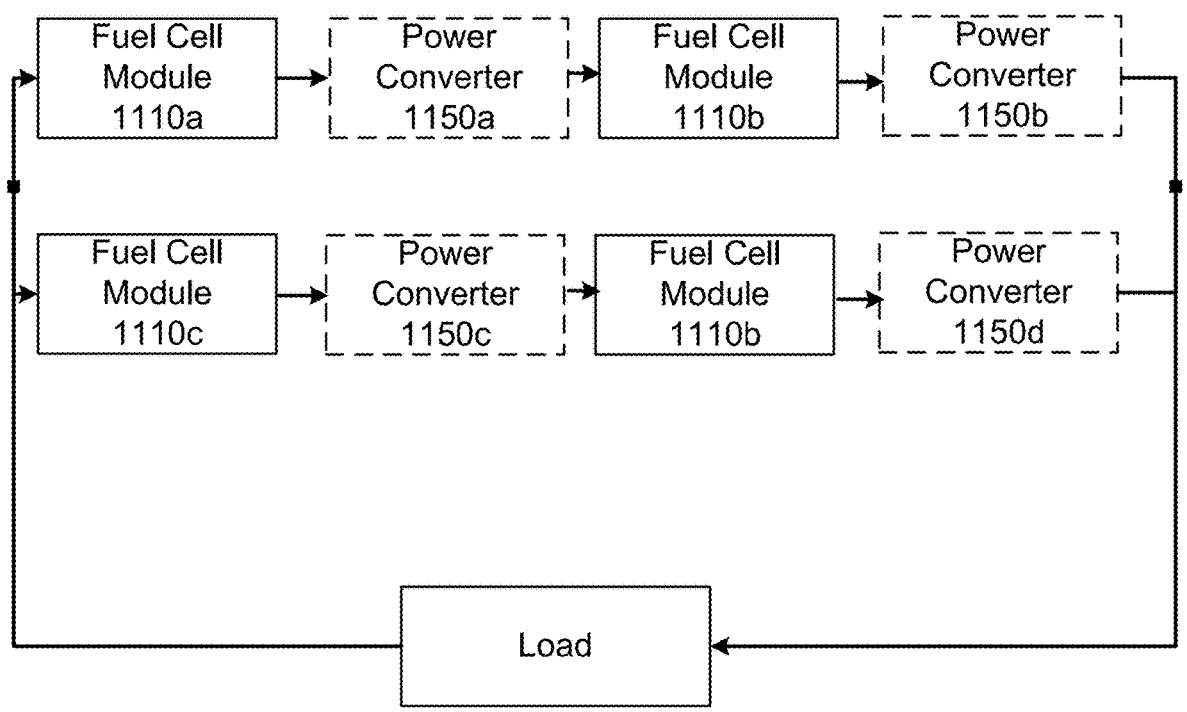

In another embodiment, shown schematically in FIG. 14B, the fuel cell modules 1110a, 1110b, 1110c, and 1100d of fuel cell electrical power system 1100 may be electrically coupled in a series/parallel electrical circuit, so that the voltage of fuel cell modules 1110a and 1110b is summed, but at the same amperage level, the voltage of fuel cell modules 1110c and 1110d is summed, but at the same amperage level, and the amperage (and power) level of the two pairs of fuel cell modules is summed, to supply electrical power to the load at twice the voltage but half the amperage (and the same power) as the arrangement shown in FIG. 14A. In some embodiments, a first power converter 1150a and/or a second power converter 1150b may also be connected in series with the fuel cell modules 1110a and 1110b (e.g., the first power converter 1150a coupled to an electrical outlet of the fuel cell module 1110a and a second power converter 1150b coupled to an outlet of the fuel cell 1110b, or only the second power converter 1150b coupled to the electrical outlet of the fuel cell module 1150b) to step up the summed voltage produced by the fuel cell modules 1110a and 1110b. Similarly, a third power converter 1150c and/or a fourth power converter 1150d may be connected in series with the fuel cell modules 1110c and 1110d (e.g., the third power converter 1150c coupled to an electrical outlet of the fuel cell module 1110c and a fourth power converter 1150d coupled to an outlet of the fuel cell module 1110d, or only the fourth power converter 1150d coupled to the electrical outlet of the fuel cell module 1150d) to step up the summed voltage produced by the fuel cell modules 1110c and 1110d.

Figure 15:
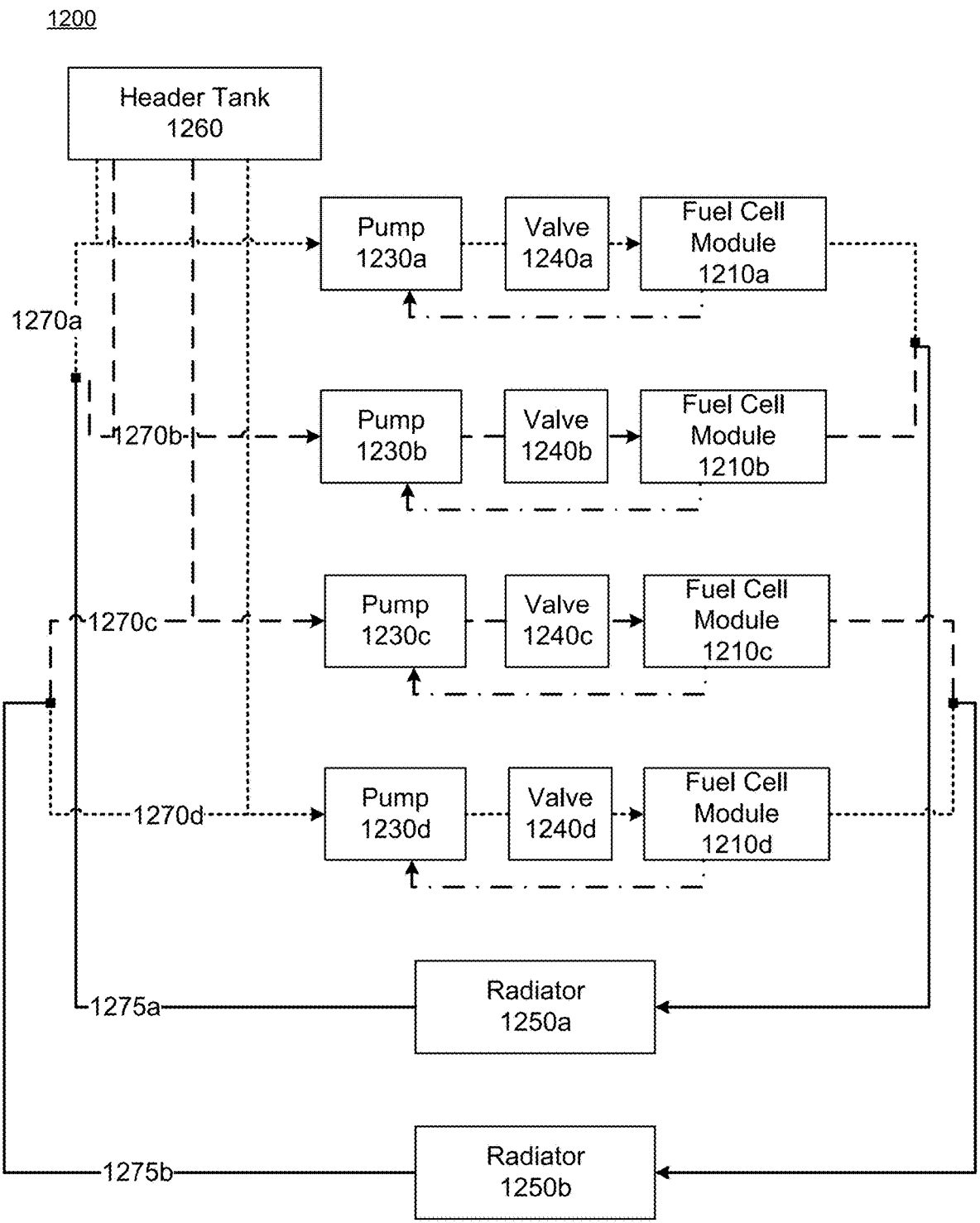
FIG. 15 is a schematic illustration of a parallel fuel cell electrical power system with four fuel cell modules (and a coolant pump and a valve associated with each fuel cell module) with two heat exchangers and associated common coolant piping, each coupled to two of the fuel cell modules, according to another embodiment.

Fuel cell electrical power system 1200, shown in FIG. 15, is similar to fuel cell electrical power system 1100 shown in FIG. 13, except that the four fuel cell modules, 1210a, 1210b, 1210c, and 1210d (and associated pumps 1230a, 1230b, 1230c, and 1230d and valves 1240a, 1240b, 1240c, and 1240d, disposed between header tank 1260 and the fuel cell modules, on coolant piping branches 1270a, 1270b, 1270c, and 1270d) are connected to two separate common coolant pipings 1275a and 1275b, which carry coolant fluid through heat exchangers 1250a, 1250b. As with the other configurations disclosed above, in a scenario in which any one of the paired fuel cell modules (1210a, 1210b, and 1210c, 1210d) is not operating, and correspondingly their associated pump is not operating and therefore not generating a pressure increase from the common pressure set by header tank 1260, the higher pressure on the output side of the operating fuel cell module cannot drive coolant flow through the non-operating fuel cell module on the shared common coolant piping 1275a or 1275b because the associated valve is closed (e.g., if the valve is a check valve, automatically in response to the higher pressure on the fuel cell module side of the valve compared to the lower pressure on the pump side of the valve)—all of the coolant fluid flow on the coolant piping branch associated with the operating fuel cell modules will therefore flow through the associated common coolant piping 1275a or 1275b (and heat exchanger 1250a or 1250b).

The embodiments described above illustrate several possible configurations, e.g. several different arrangements of components in the direction of flow of coolant through the system. These configurations, and the relative position of the system components in coolant flow direction, are summarized in Table 1, below.

TABLE 1

| System | Relative component position | | | | | | |
|---|---|---|---|---|---|---|---|
| 100 | FCM 110a<br>FCM 110b | Header Tank 160 | Pump 130 | | | | Heat Exchanger 150 |
| 200 | FCM 210a<br>FCM 210b | Header Tank 260 | Pump 230a<br>Pump 230b | | | | Heat Exchanger 250 |
| 300 | FCM 310a<br>FCM 310b | Header Tank 360 | Pump 330a<br>Pump 330b | Valve 340a<br>Valve 340b | | | Heat Exchanger 350 |
| 400 | | Header Tank 460 | Pump 430a<br>Pump 430b | Valve 440a<br>Valve 440b | FCM 410a<br>FCM 410b | | Heat Exchanger 450 |
| 500 | | Header Tank 560 | Pump 530a<br>Pump 530b | FCM 510a<br>FCM 510b | Valve 540a<br>Valve 540b | | Heat Exchanger 550 |
| 600 | | Header Tank 660 | Pump 630 | Valve 640a<br>Valve 640b | FCM 610a<br>FCM 610b | | Heat Exchanger 650 |
| 700 | | Header Tank 760<br>Header Tank | Pump 730a<br>Pump 730b<br>Pump | Valve 740a<br>Valve 740b<br>Valve a<br>Valve b | FCM 710a<br>AC 790a<br>FCM 710b<br>AC 790b<br>FCM a<br>AC a<br>FCM b<br>AC b | | Heat Exchanger 750<br>Heat Exchanger 750 |
| 800 | | Header Tank 860 | Pump 830a<br><br>Pump 830b | Valve 840a<br><br>Valve 840b | FCM 810a<br>FCM 810b<br>FCM 810a<br>FCM 810b | Valve 842a<br>Valve 842b | Heat Exchanger 850<br><br>Filter 895 |
| 900 | | Header Tank 960 | Pump 930a<br>Pump 930b | Valve 940a<br>Valve 940b | FCM 910a<br>FCM 910b | Pump 932<br>Filter 995 | Heat Exchanger 950 |
| 1000 | | Header Tank 1060 | Pump 1030a<br>Pump 1030b | Valve 1040a<br>Valve 1040b | FCM 1010a<br>FCM 1010b | Pump 1032<br>Filter 1095 | Valve 1044 | Heat Exchanger 1050 |
| 1100 | | Header Tank 1160 | Pump 1130a<br>Pump 1130b<br>Pump 1130c<br>Pump 1130d | Valve1 140a<br>Valve 1140b<br>Valve 1140c<br>Valve 1140d | FCM 1110a<br>FCM 1110b<br>FCM 1110c<br>FCM 1110d | | Heat Exchanger 1150 |
| 1200 | | Header Tank 1260 | Pump 1230a<br>Pump 1230b<br>Pump 1230c<br>Pump 1230d | Valve1 240a<br>Valve 1240b<br>Valve 1240c<br>Valve 1240d | FCM 1210a<br>FCM 1210b<br>FCM 1210c<br>FCM 1210d | | Heat Exchanger 1250a<br><br>Heat Exchanger 1250b |

Figure 16:
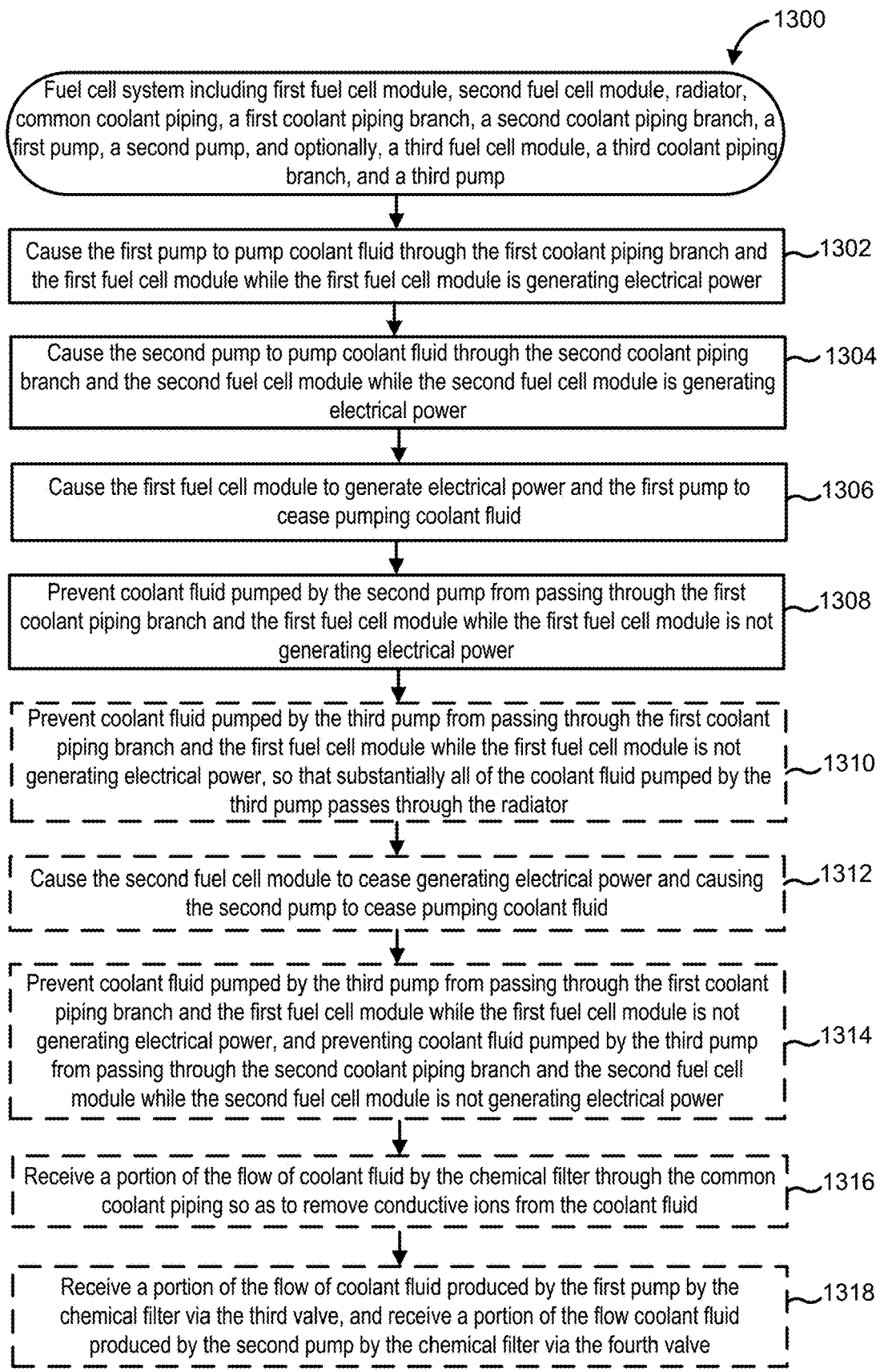
FIG. 16 is a schematic flow chart of a method for cooling multiple fuel cell modules included in a fuel cell electrical power system, according to an embodiment.

FIG. 16 is a schematic flow chart of a method 1300 for cooling multiple fuel cell modules (e.g., the fuel cell modules 110*a/b*, 210*a/b*, 310*a/b*, 410*a/b*, 510*a/b*, 710*a/b*, 810*a/b*, 910*a/b*, 1010*a/b*, 1110*a/b/c/d*, 1210*a/b/c/d*, or any other fuel cell module described herein) included in a fuel cell electrical power system (e.g., the fuel cell electrical power system 100, 200, 300, 400, 500, 600, 700, 800, 900, 1000, 1100, or 1200), according to an embodiment. The fuel cell electrical power system may include any of the fuel cell electrical power systems described herein. In some embodiment the fuel cell electrical power system may include a first fuel cell module (e.g., the first fuel cell module 110*a*, 210*a*, 310*a*, 410*a*, 510*a*, 710*a*, 810*a*, 910*a*, 1010*a*, 1110*a*, 1210*a*, or any other first fuel cell module described herein), and a second fuel cell module (e.g., the second fuel cell modules 110*a*, 210*a*, 310*a*, 410*a*, 510*a*, 710*a*, 810*a*, 910*a*, 1010*a*, 1110*a*, 1210*a*, or any other second fuel cell module described herein).

The fuel cell electrical power system may also include a heat exchanger (e.g., the heat exchanger 150, 250, 350, 450, 550, 650, 750, 850, 950, 1050, 1150, 1250*a/b*, or any other heat exchanger described herein). The fuel cell electrical power system also includes a common coolant piping (e.g., the common coolant piping 175, 275, 375, 475, 575, 675, 775, 875, 975, 1075, 1175, 1275*a/b*, or any other common coolant piping described herein) having an inlet end and an outlet end and being fluidically coupled to the heat exchanger to carry coolant fluid through the heat exchanger from an inlet. A first coolant piping branch may be fluidically coupled in series to the outlet end of the common coolant piping, the first fuel cell module and the inlet end of the common coolant piping, and a second coolant piping branch may be fluidically coupled in series to the outlet end of the common coolant piping, the second fuel cell module and the inlet end of the common coolant piping.

The fuel cell electrical power system may also include a first pump (e.g., the first pump 230*a*, 330*a*, 430*a*, 530*a*, 730*a*, 830*a*, 930*a*, 1030*a*, 1130*a*, or any other first pump described herein) disposed on the first coolant piping branch between the outlet end of the common coolant piping and the first fuel cell module, and operable to generate a controllable rate of flow of coolant fluid in a first direction through the first coolant piping branch. Moreover, the fuel cell electrical power system may also include a second pump (e.g., the second pump 230*b*, 330*b*, 430*b*, 530*b*, 730*b*, 830*b*, 930*b*, 1030*b*, 1130*b*, or any other second pump described herein) disposed on the second coolant piping branch between the outlet end of the common coolant piping and the second fuel cell module, and operable to generate a controllable rate of flow of coolant fluid through the second coolant piping branch.

The method 1300 includes causing the first pump to pump coolant fluid through the first coolant piping branch and the first fuel cell module while the first fuel cell module is generating electrical power, at 1302. For example, the first pump may be selectively activated to cause the first pump to pump coolant fluid through the first coolant piping branch. At 1304, the second pump is caused to pump coolant fluid through the second coolant piping branch and the second fuel cell module while the second fuel cell module is generating electrical power. For example, the second pump may be selectively activated to cause the second pump to pump coolant fluid through the second coolant piping branch.

At 1306, the first fuel cell module is caused to cease generating electrical power and the first pump is caused to cease pumping coolant fluid. At 1308, the coolant fluid pumped by the second pump is prevented from passing through the first coolant piping branch and the first fuel cell module while the first fuel cell module is not generating electrical power, so that substantially all of the coolant fluid pumped by the first pump passes through the heat exchanger. In this manner, operating losses that may be incurred due to the coolant fluid flowing through the non-operational first pump are inhibited.

In some embodiments, the fuel cell electrical power system may include a first valve (e.g., the first valve 340*a*, 440*a*, 540*a*, 640*a*, 740*a*, 840*a*, 940*a*, 1040*a*, 1140*a*, or any other first valve described herein) disposed on the first coolant piping branch and configured to selectively modulate fluid flow through the first coolant piping branch. In such implementations, the preventing coolant fluid pumped by the second pump from passing through the first coolant piping branch includes the first valve preventing coolant fluid from flowing through the first coolant piping branch in a second direction opposite to the first direction.

In some embodiments, the fuel cell electrical power system may optionally, also include a third fuel cell module (e.g., the third fuel cell module 1110*c*, or any other third fuel cell module 1110*c* described herein), a third coolant piping branch fluidically coupling in series the outlet end of the common coolant piping, the third fuel cell module and the inlet end of the common coolant piping, and a third pump (e.g., the third pump 1130*c*) disposed on the third coolant piping branch between the outlet end of the common coolant piping and the third fuel cell module. The third pump may be operable to generate a controllable rate of flow of coolant fluid through the third coolant piping branch. In such embodiments, the method 1300 may further include preventing coolant fluid pumped by the third pump from passing through the first coolant piping branch and the first fuel cell module while the first fuel cell module is not generating electrical power, so that substantially all of the coolant fluid pumped by the third pump passes through the heat exchanger, at 1310.

In some embodiments, the method 1300 may also include causing the second fuel cell module to cease generating electrical power and causing the second pump to cease pumping coolant fluid, at 1312. Moreover, at 1314, the coolant fluid pumped by the third pump is prevented from passing through the first coolant piping branch and the first fuel cell module while the first fuel cell module is not generating electrical power, as described herein. The coolant fluid pumped by the third pump is also prevented from passing through the second coolant piping branch and the second fuel cell module while the second fuel cell module is not generating electrical power, so that substantially all of the coolant fluid pumped by the third pump passes through the heat exchanger, as described herein.

In some embodiments, the second pump may be operable to generate the controllable rate of flow coolant fluid in a first direction through the second coolant piping branch. In such embodiments, the fuel cell electrical power system may also include a second valve (e.g., the second valve 340*b*, 440*b*, 540*b*, 640*b*, 740*b*, 840*b*, 940*b*, 1040*b*, 1140*b*, or any other second valve described herein) disposed on the second coolant piping branch and configured to selectively modulate fluid flow through the second coolant piping branch. In such embodiments, the preventing the coolant fluid pumped by the third pump from passing through the second coolant piping branch may include the second valve preventing coolant fluid from flowing through the second coolant piping branch in a second direction opposite to the first direction.

In some embodiments, the fuel cell electrical power system further includes a chemical filter (e.g., the filter 895, 1095, or any other filter described herein) disposed in parallel with the common coolant piping. In such embodiments, the method 1300 may further include receiving a portion of the flow of coolant fluid by the chemical filter through the common coolant piping so as to remove conductive ions from the coolant fluid, at 1316. In some embodiments, the power system may further include a third valve (e.g., the third valve 1140*c*, 1240*c*, or any other third valve described herein) that couples the chemical filter to the common coolant piping. In such embodiments, the third valve may be operated to selectively direct flow of coolant fluid in the common coolant piping either through the chemical filter or to bypass the chemical filter, or to direct a first portion of the flow of coolant fluid through the chemical filter and direct a second portion of the coolant fluid to bypass the chemical filter (e.g., about 50% through the chemical filter and 50% to bypass the chemical filter).

In some embodiments, the fuel cell electrical power system may include a chemical filter coupled to the first coolant piping branch by a third valve between the first pump and the first fuel cell module, to the second coolant piping branch by a fourth valve (e.g., the fourth valve 840b, 1140b, or any other fourth valve described herein) between the second pump and the second fuel cell module, and to one of the common coolant piping, the first coolant piping branch, and the second coolant piping branch between the heat exchanger and the first pump and/or second pump. In such embodiments, the method 1300 may also include receiving a portion of the flow of coolant fluid produced by the first pump by the chemical filter via the third valve, and receiving a portion of the flow coolant fluid produced by the second pump by the chemical filter via the fourth valve, at 1318. The chemical filter may be configured to remove conductive ions from the coolant fluid passing therethrough, and disposed to discharge the deionized coolant fluid into the one of common coolant piping, the first coolant piping branch, and the second coolant piping branch, as previously described. In some embodiments, the fuel cell electrical power system may further include a header tank (e.g., the 160, 260, 360, 460, 560, 660, 760, 860, 960, 1060, 1160, 1260, or any other header tank described herein) fluidically coupled to the first coolant piping branch between the outlet end of the common coolant piping and the first pump, and fluidically coupled to the second coolant piping branch between the outlet end of the common coolant piping and the second pump. The header tank may provide overflow capacity, accommodate thermal expansion of the volume of the coolant, and maintains a head of pressure on the coolant in fuel cell electrical power system. The header tank can also provide a path for the venting from the coolant fluid hydrogen that passively leaks from the fuel cell modules into the coolant fluid, as previously described.

In some embodiments, the fuel cell electrical power system further includes a first air compressor (e.g., the air compressor 790a) fluidically coupled to the first fuel cell module and configured to supply pressurized air thereto, the first air compressor disposed on the first coolant piping branch between the first pump and the inlet to the common coolant piping. The fuel cell electrical power system may also include a second air compressor (e.g., the air compressor 790b) fluidically coupled to the second fuel cell module and configured to supply pressurized air thereto, the second air compressor disposed on the second coolant piping branch between the second pump and the inlet to the common coolant piping.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. A fuel cell electrical power system, comprising:
a first fuel cell module and a second fuel cell module;
a heat exchanger;
a common coolant piping having an inlet end and an outlet end and being fluidically coupled to the heat exchanger to carry coolant fluid through the heat exchanger from an inlet;
a first coolant piping branch fluidically coupling in series the outlet end of the common coolant piping, the first fuel cell module, and the inlet end of the common coolant piping;
a second coolant piping branch fluidically coupling in series the outlet end of the common coolant piping, the second fuel cell module, and the inlet end of the common coolant piping;
a first pump disposed on the first coolant piping branch between the outlet of the common coolant piping and the first fuel cell module, and operable to generate a controllable flow rate of coolant fluid through the first coolant piping branch;
a second pump disposed on the second coolant piping branch between the outlet of the common coolant piping and the second fuel cell module, and operable to generate a controllable flow rate of coolant fluid through the second coolant piping branch;
a first valve disposed on the first coolant piping branch and configured to selectively allow the flow of coolant fluid through the first coolant piping branch; and
a second valve disposed on the second coolant piping branch and configured to selectively allow the flow of coolant fluid through the second coolant piping branch;
a header tank fluidically coupled to the first coolant piping branch between the outlet end of the common coolant piping and the first pump, and fluidically coupled to the second coolant piping branch between the outlet end of the common coolant piping and the second pump;
the fuel cell electrical power system being capable of functioning in a condition in which the second fuel cell module and the second pump are not operating to cause substantially all of the flow rate of coolant fluid produced by the first pump to circulate through the common coolant piping and to circulate substantially none of the flow rate of the coolant fluid produced by the first pump through the second fuel cell module.

2. The fuel cell electrical power system of claim 1, wherein each of the first valve and the second valve is a check valve.

3. The fuel cell electrical power system of claim 1, wherein the first fuel cell module includes a controller operable to control the first pump to generate a flow rate of coolant fluid selected to maintain the first fuel cell module within a predetermined operating temperature range for a selected electrical power output level of the first fuel cell module.

4. The fuel cell electrical power system of claim 1, wherein the first valve is disposed on the first coolant piping branch between the first pump and the first fuel cell module.

5. The fuel cell electrical power system of claim 1, wherein the first valve is disposed on the first coolant piping branch between the first fuel cell module and the inlet end of the common coolant piping.

6. The fuel cell electrical power system of claim 1, further comprising a first air compressor fluidically coupled to the first fuel cell module and configured to supply pressurized air thereto, the first air compressor disposed on the first coolant piping branch between the first pump and the inlet to the common coolant piping.

7. The fuel cell electrical power system of claim 6, further comprising a second air compressor fluidically coupled to the second fuel cell module and configured to supply pressurized air thereto, the second air compressor disposed on the second coolant piping branch between the second pump and the inlet to the common coolant piping.

8. The fuel cell electrical power system of claim 1, further comprising a third pump disposed on the common coolant piping between the inlet to the common coolant piping and the heat exchanger, the third pump operable to boost the pressure of the flow of coolant fluid from the first pump and the second pump on the common coolant piping.

9. The fuel cell electrical power system of claim 1, further comprising a chemical filter disposed in parallel with the common coolant piping to receive a portion of the flow of coolant fluid through the common coolant piping and to remove conductive ions from the coolant fluid.

10. The fuel cell electrical power system of claim 9, further comprising:
a third pump disposed on the common coolant piping between the inlet to the common coolant piping and the heat exchanger, the third pump operable to boost the pressure of the flow of coolant fluid from the first pump and the second pump on the common coolant piping,
the chemical filter being disposed in parallel with the third pump to receive a portion of the coolant fluid from the common coolant piping at an outlet of the third pump and return the portion of the coolant fluid to the common coolant piping at an inlet of the third pump.

11. The fuel cell electrical power system of claim 1, further comprising a chemical filter disposed in parallel with the common coolant piping and a third valve coupling the chemical filter to the common coolant piping, the third valve operable to selectively direct flow of coolant fluid in the common coolant piping either through the chemical filter or to bypass the chemical filter, or to direct a first portion of the flow of coolant fluid through the chemical filter and direct a second portion of the coolant fluid to bypass the chemical filter, the chemical filter configured to remove conductive ions from the coolant fluid.

12. The fuel cell electrical power system of claim 1, further comprising a chemical filter coupled to the first coolant piping branch by a third valve between the first pump and the first fuel cell module, to the second coolant piping branch by a fourth valve between the second pump and the second fuel cell module, and to one of the common coolant piping, the first coolant piping branch, and the second coolant piping branch between the heat exchanger and the first pump and/or second pump, the chemical filter disposed to receive a portion of the flow of coolant fluid produced by the first pump via the third valve, to receive a portion of the flow of coolant fluid produced by the second pump via the fourth valve, configured to remove conductive ions from the coolant fluid passing therethrough, and disposed to discharge the deionized coolant fluid into the one of common coolant piping, the first coolant piping branch, and the second coolant piping branch.

13. The fuel cell electrical power system of claim 1, further comprising:
a third fuel cell module;
a third coolant piping branch fluidically coupling in series the outlet end of the common coolant piping, the third fuel cell module and the inlet end of the common coolant piping; and
a third pump disposed on the third coolant piping branch between the outlet end of the common coolant piping and the third fuel cell module, and operable to generate a controllable rate of flow of coolant fluid through the third coolant piping branch.

14. The fuel cell electrical power system of claim 1, wherein the first fuel cell module and the second fuel cell module are electrically coupled in a parallel electrical circuit.

15. The fuel cell electrical power system of claim 1, wherein the heat exchanger is a first heat exchanger, the common coolant piping is a first common coolant piping, and further comprising:
a third first fuel cell module and a fourth fuel cell module;
a second heat exchanger;
a second common coolant piping having an inlet end and an outlet end and being fluidically coupled to the second heat exchanger to carry coolant fluid through the second heat exchanger from an inlet;
a third coolant piping branch fluidically coupling in series the outlet end of the second common coolant piping, the third fuel cell module and the inlet end of the second common coolant piping;
a fourth coolant piping branch fluidically coupling in series the outlet end of the second common coolant piping, the fourth fuel cell module and the inlet end of the second common coolant piping;
a third pump disposed on the third coolant piping branch between the outlet of the second common coolant piping and the third fuel cell module, and operable to generate a controllable flow rate of coolant fluid through the third coolant piping branch;
a fourth pump disposed on the fourth coolant piping branch between the outlet of the second common coolant piping and the fourth fuel cell module, and operable to generate a controllable flow rate of coolant fluid through the fourth coolant piping branch;
a third valve disposed on the third coolant piping branch and configured to selectively allow the flow of coolant fluid through the third coolant piping branch; and
a fourth valve disposed on the fourth coolant piping branch and configured to selectively allow the flow of coolant fluid through the fourth coolant piping branch;
the fuel cell electrical power system being capable of functioning in a condition in which the fourth fuel cell module and the fourth pump are not operating to cause substantially all of the flow rate of coolant fluid produced by the third pump to circulate through the second common coolant piping and to circulate substantially none of the flow rate of the coolant fluid produced by the third pump through the fourth fuel cell module.

16. The fuel cell electrical power system of claim 15, wherein the first fuel cell module and the second fuel cell module are electrically coupled in a parallel electrical circuit, and the third fuel cell module and the fourth fuel cell module are electrically coupled in a parallel electrical circuit.

17. The fuel cell electrical power system of claim 16, wherein first fuel cell module, the second fuel cell module, the third fuel cell module, and the fourth fuel cell module are all electrically coupled in the same parallel electrical circuit.

18. The fuel cell electrical power system of claim 16, further comprising at least one power converter coupled to an electrical outlet of the first fuel cell module and the second fuel cell module, and at least one power converter coupled to an electrical outlet of the third fuel cell module and the fourth fuel cell module.

* * * * *